(12) United States Patent
Aga et al.

(10) Patent No.: US 11,990,064 B2
(45) Date of Patent: May 21, 2024

(54) DISPLAY PROCESSING DEVICE, DISPLAY PROCESSING METHOD, STORAGE MEDIUM, AND INFORMATION PROCESSING DEVICE

(71) Applicant: Sony Group Corporation, Tokyo (JP)

(72) Inventors: Hiroyuki Aga, Tokyo (JP); Hirotake Ichikawa, Kanagawa (JP); Atsushi Ishihara, Kanagawa (JP); Mitsuru Nishibe, Chiba (JP); Hiroshi Matsuyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/019,948

(22) PCT Filed: Jul. 19, 2021

(86) PCT No.: PCT/JP2021/026943
§ 371 (c)(1),
(2) Date: Feb. 6, 2023

(87) PCT Pub. No.: WO2022/049908
PCT Pub. Date: Mar. 10, 2022

(65) Prior Publication Data
US 2023/0290285 A1 Sep. 14, 2023

(30) Foreign Application Priority Data
Sep. 7, 2020 (JP) .................. 2020-149788

(51) Int. Cl.
*G09G 3/00* (2006.01)
*G06F 3/01* (2006.01)

(52) U.S. Cl.
CPC ............. *G09G 3/001* (2013.01); *G06F 3/012* (2013.01); *G06F 3/013* (2013.01);
(Continued)

(58) Field of Classification Search
CPC .......... G09G 3/001; G09G 2320/0261; G09G 2340/0464; G09G 2370/02; G09G 2370/16; G06F 3/012; G06F 3/013
See application file for complete search history.

(56) References Cited

U.S. PATENT DOCUMENTS

2020/0012105 A1\* 1/2020 Liu ................... G02B 27/0172
2020/0013401 A1\* 1/2020 Saito ...................... G06F 3/167
(Continued)

FOREIGN PATENT DOCUMENTS

JP 2016-527536 A 9/2016
JP 2019-004978 A 1/2019
(Continued)

*Primary Examiner* — Sejoon Ahn
(74) *Attorney, Agent, or Firm* — Paratus Law Group, PLLC

(57) ABSTRACT

There is provided a display processing device, a display processing method, a storage medium, and an information processing device capable of reducing a delay in a case where data of a virtual object generated by an external device is received and displayed. The display processing device includes: a transmission unit that transmits first motion information of a mobile terminal to an external device; a reception unit that receives, at a first time, data of a first display area of a virtual object drawn on the basis of the first motion information by the external device, and receives, at a second time later than the first time, data of a second display area adjacent to the first display area of the virtual object drawn on the basis of the first motion information by the external device; and a display control unit that, after displaying the received data of the first display area, performs control to display the data of the second display area together with the data of the first display area as one frame on a display device of the mobile terminal.

14 Claims, 16 Drawing Sheets

(52) U.S. Cl.
    CPC .............. *G09G 2320/0261* (2013.01); *G09G 2340/0464* (2013.01); *G09G 2370/02* (2013.01); *G09G 2370/16* (2013.01)

(56) References Cited

U.S. PATENT DOCUMENTS

| | | | |
|---|---|---|---|
| 2020/0018962 A1* | 1/2020 | Lu | G02B 27/0172 |
| 2020/0020310 A1* | 1/2020 | Kumar | G06F 3/0346 |
| 2020/0021785 A1* | 1/2020 | Mima | H04N 9/3182 |
| 2021/0063734 A1* | 3/2021 | Maric | G02B 27/0172 |
| 2021/0063741 A1* | 3/2021 | Riguer | G09G 5/373 |
| 2021/0067744 A1* | 3/2021 | Buibas | G06F 3/012 |

FOREIGN PATENT DOCUMENTS

| | | |
|---|---|---|
| WO | WO 2013/046288 A1 | 4/2013 |
| WO | WO 2019/181263 A1 | 9/2019 |
| WO | WO 2020/170454 A1 | 8/2020 |

\* cited by examiner

FIG. 13
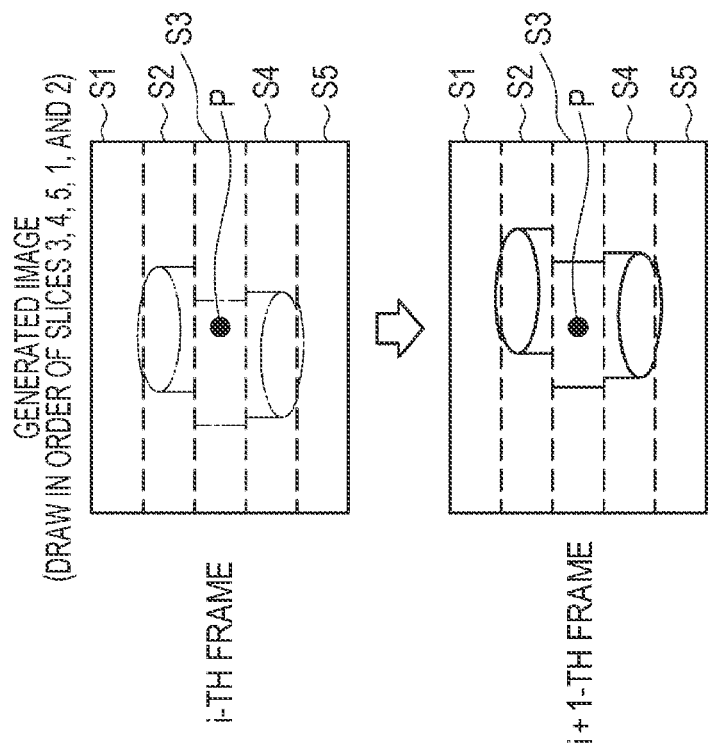
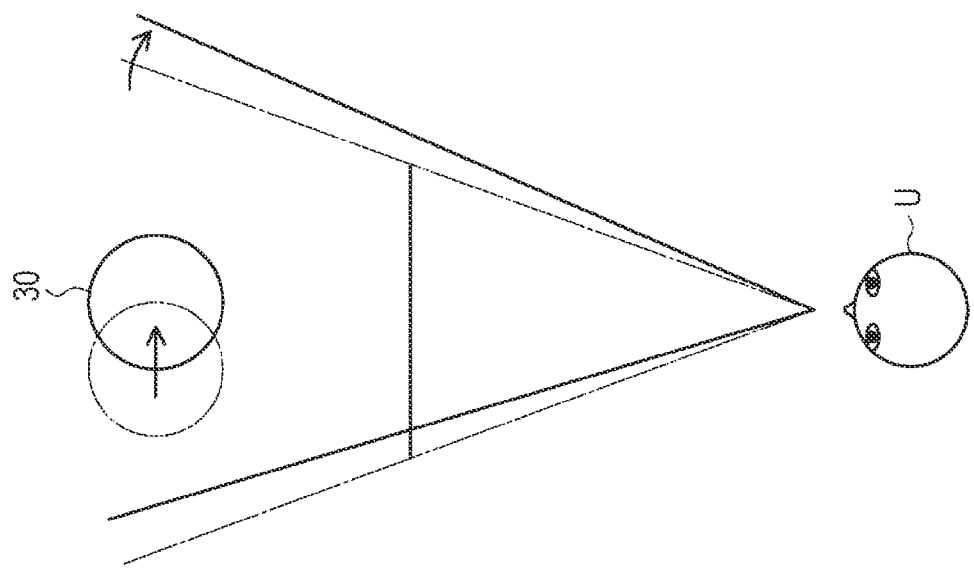

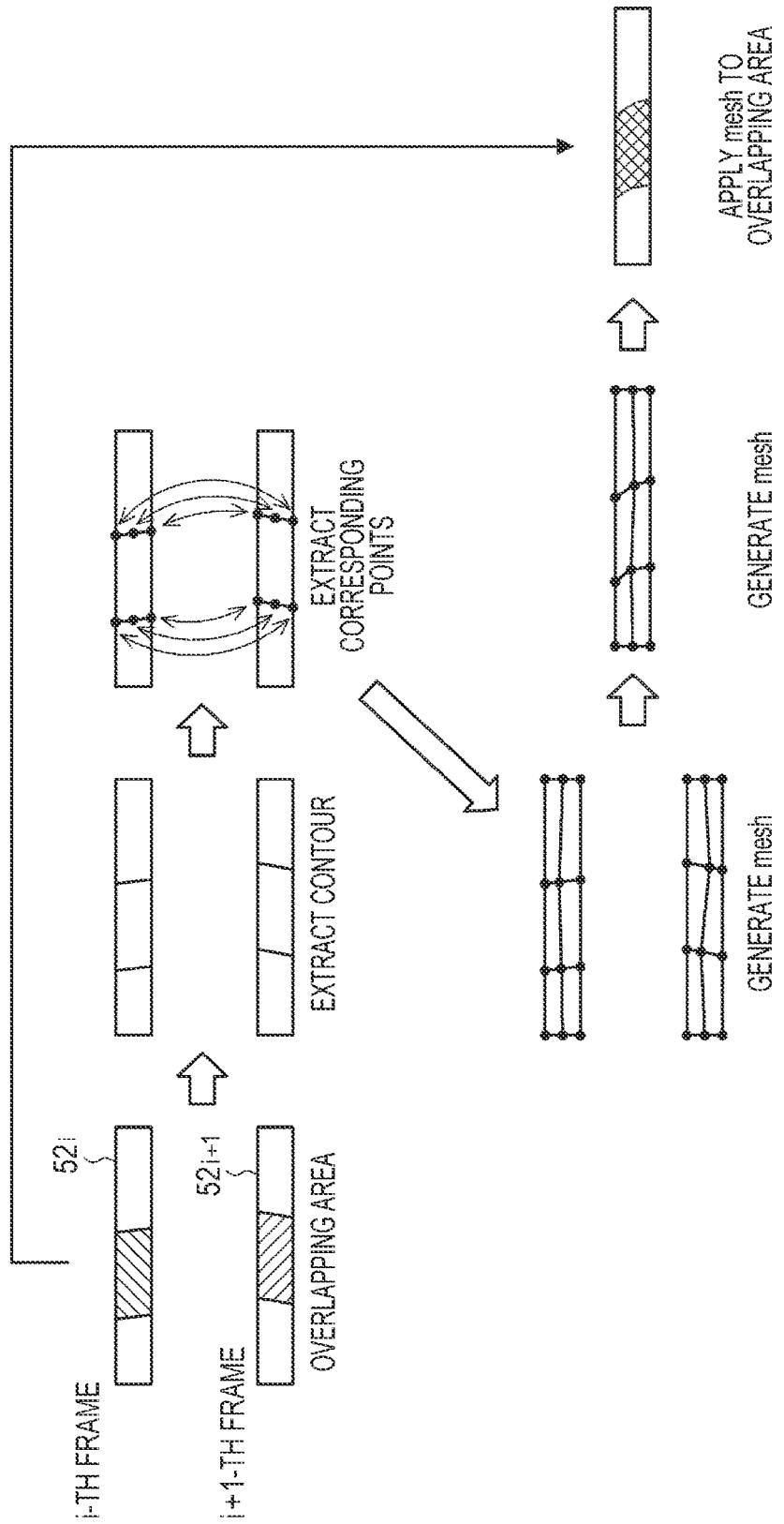

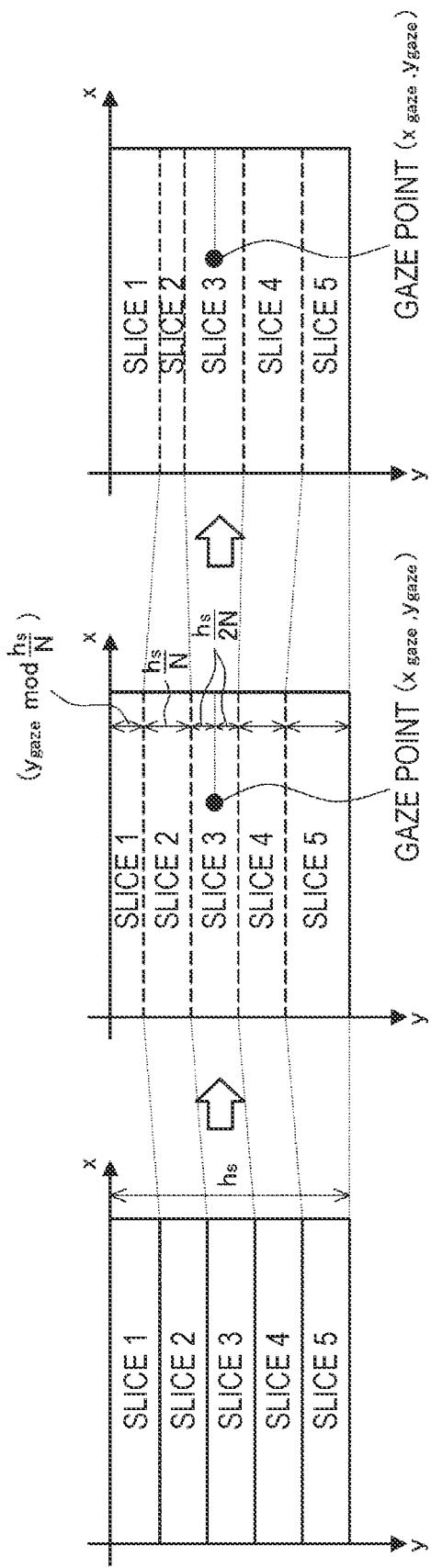

DISPLAY PROCESSING DEVICE, DISPLAY PROCESSING METHOD, STORAGE MEDIUM, AND INFORMATION PROCESSING DEVICE

CROSS REFERENCE TO PRIOR APPLICATION

This application is a National Stage Patent Application of PCT International Patent Application No. PCT/JP2021/026943 (filed on Jul. 19, 2021) under 35 U.S.C. § 371, which claims priority to Japanese Patent Application No. 2020-149788 (filed on Sep. 7, 2020), which are all hereby incorporated by reference in their entirety.

TECHNICAL FIELD

The present disclosure relates to a display processing device, a display processing method, a storage medium, and an information processing device.

BACKGROUND ART

In recent years, various technologies for viewing real space and virtual space in a fused manner have been developed. For example, augmented reality (AR) technology in which an image (hereinafter referred to as virtual object) of virtual space is superimposed and displayed in real space in a state where real space is directly viewed, and virtual reality (VR) technology in which generated virtual space is viewed from an arbitrary viewpoint have been developed. Such AR and VR can be provided using, for example, a head mounted display (HMD) which is a display device worn on the head of the user. More specifically, examples of a device that achieves AR include an optically transmissive HMD. Furthermore, examples of a device that achieves VR include a non-transmissive HMD that covers a user's field of view with a display unit in order to further enhance a sense of immersion.

Furthermore, regarding the technology of displaying a virtual object using an HMD, for example, Patent Document 1 below describes that when a virtual object is superimposed and displayed in real space by an optically transmissive HMD, the position and orientation of the virtual object follow the movement of the user wearing the HMD or an object in real space, thereby reducing the sense of discomfort due to deviation of the display position of the virtual object with respect to real space.

CITATION LIST

Patent Document

Patent Document 1: International Patent Application Publication No. 2019/181263

SUMMARY OF THE INVENTION

Problems to be Solved by the Invention

In the above conventional technology, a delay in a case where data of a virtual object generated by an external device is received and displayed is not considered.

Therefore, the present disclosure proposes a display processing device, a display processing method, a storage medium, and an information processing device capable of reducing a delay in a case where data of a virtual object generated by an external device is received and displayed.

Solutions to Problems

According to the present disclosure, there is proposed a display processing device including: a transmission unit that transmits first motion information of a mobile terminal to an external device; a reception unit that receives, at a first time, data of a first display area of a virtual object drawn on the basis of the first motion information by the external device, and receives, at a second time later than the first time, data of a second display area adjacent to the first display area of the virtual object drawn on the basis of the first motion information by the external device; and a display control unit that, after displaying the received data of the first display area, performs control to display the data of the second display area together with the data of the first display area as one frame on a display device of the mobile terminal.

According to the present disclosure, there is proposed a display processing method including the steps of a processor transmitting first motion information of a mobile terminal to an external device, receiving, at a first time, data of a first display area of a virtual object drawn on the basis of the first motion information by the external device, and receiving, at a second time later than the first time, data of a second display area adjacent to the first display area of the virtual object drawn on the basis of the first motion information by the external device, and after displaying the received data of the first display area, performing control to display the data of the second display area together with the data of the first display area as one frame on a display device of the mobile terminal.

According to the present disclosure, there is proposed a storage medium storing a program for causing a computer to function as: a transmission unit that transmits first motion information of a mobile terminal to an external device; a reception unit that receives, at a first time, data of a first display area of a virtual object drawn on the basis of the first motion information by the external device, and receives, at a second time later than the first time, data of a second display area adjacent to the first display area of the virtual object drawn on the basis of the first motion information by the external device; and a display control unit that, after displaying the received data of the first display area, performs control to display the data of the second display area together with the data of the first display area as one frame on a display device of the mobile terminal.

According to the present disclosure, there is proposed an information processing device including a reception unit that receives first motion information of a mobile terminal, and a transmission unit that transmits, at a first time, data of a first display area of a virtual object drawn as a part of one frame on the basis of the first motion information to a display processing device that performs control to display the data of the first display area on a display device of the mobile terminal, and, after drawing the data of the first display area on the basis of the first motion information, transmits, at a second time later than the first time, data of a second display area adjacent to the first display area of the virtual object drawn as another part of the one frame to the display processing device.

BRIEF DESCRIPTION OF DRAWINGS

FIG. 13 is a diagram illustrating one example of an image generated in units of slices by an image generation unit according to the present embodiment.

FIG. 16 is a diagram specifically describing deformation of a contour line of a virtual object according to the present embodiment.

FIG. 17 is a diagram for describing adjustment of division lines for dividing one frame into a plurality of slices according to the present embodiment.

MODE FOR CARRYING OUT THE INVENTION

Hereinafter, a preferred embodiment of the present disclosure will be described in detail with reference to the accompanying drawings. Note that in the present specification and the drawings, components having substantially the same functional configuration will be assigned the same reference signs and redundant description will be omitted.

Furthermore, the description will be given in the following order.

Figure 1:
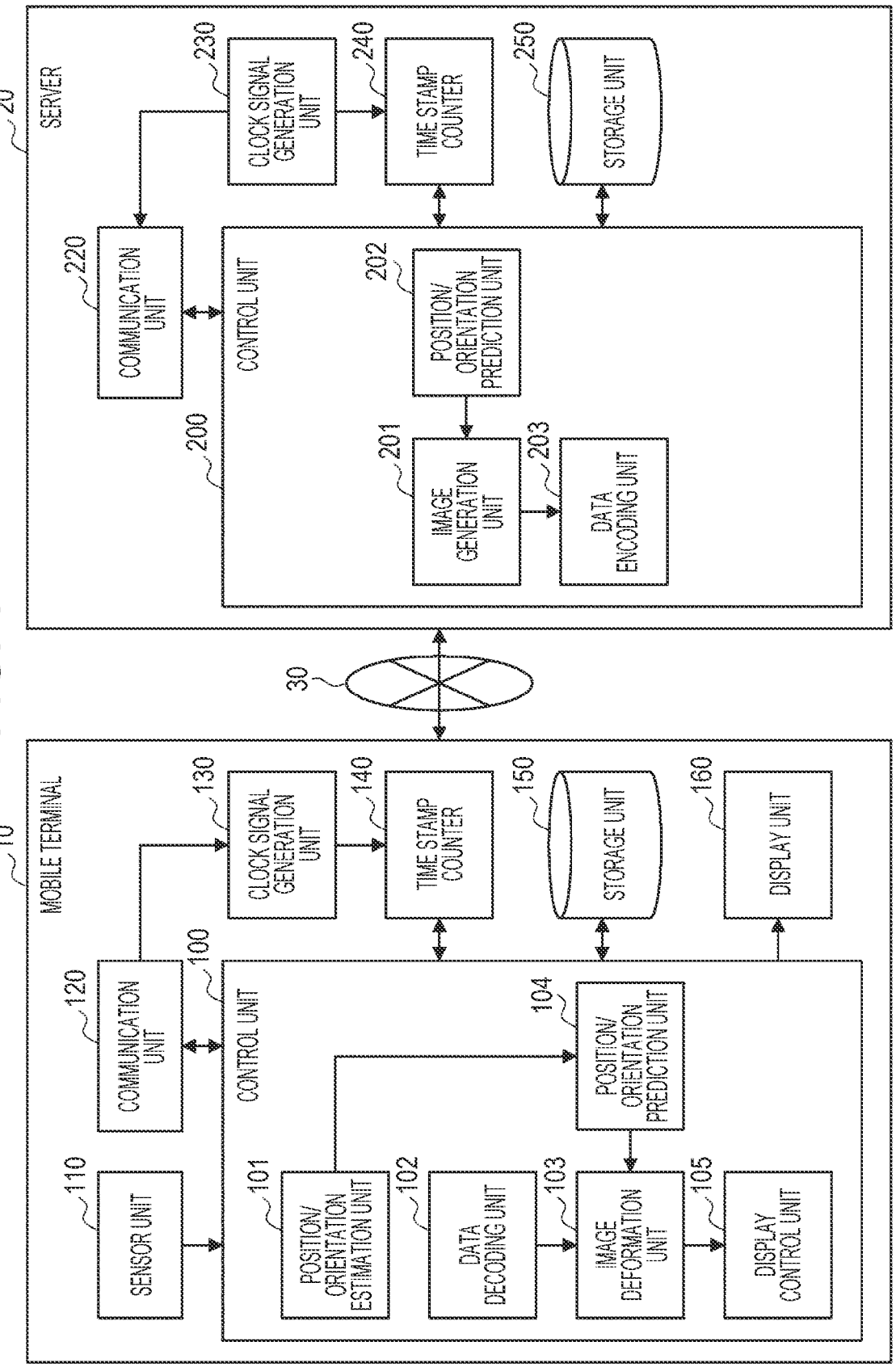
FIG. 1 is a block diagram illustrating one example of a basic configuration of an information processing device according to one embodiment of the present disclosure.

1. Configuration of display processing system according to one embodiment of present disclosure
   1-1. Configuration example of mobile terminal 10
   1-2. Configuration example of server 20
2. Summary of problems
3. Technical features
3-1. Processing in units of slices
3-2. Priority processing
3-3. Curbing tearing
   (3-3-1 Black insertion period)
   (3-3-2. Image deformation)
   (3-3-3. Adjustment of division line)
4. Supplement 1. CONFIGURATION OF DISPLAY PROCESSING SYSTEM ACCORDING TO ONE EMBODIMENT OF PRESENT DISCLOSURE FIG. 1 is a diagram illustrating a configuration of a display processing system according to one embodiment of the present disclosure. As illustrated in FIG. 1, a display processing system according to one embodiment of the present disclosure includes a mobile terminal 10 and a server 20.

The mobile terminal 10 and the server 20 are communicably connected via a network 30 to transmit and receive data. In a case where the server 20 is a cloud server, the network 30 is assumed to be the Internet (e.g., 5G (5th generation mobile communication system)) including a wireless or wired network. Furthermore, in a case where the server 20 is present in the same space as the mobile terminal 10, such as a smartphone or a notebook PC, short-range wireless communication such as Wi-Fi (registered trademark) or wired communication (USB cable or the like) is assumed.

The mobile terminal 10 is one example of an information processing terminal that performs display control of a virtual object in VR or AR. The mobile terminal 10 is implemented by, for example, an HMD worn on the head of the user, a smartphone, a tablet terminal, a wearable device such as a glasses-type display device, or the like. The mobile terminal 10 receives display data of a virtual object from the server 20 and performs control to display the display data on a display unit 160 of the mobile terminal 10. The server 20 is one example of an information processing device that generates display data of a virtual object in VR or AR. Specifically, the server 20 receives position and orientation information from the mobile terminal 10, draws a virtual object on the basis of the received position/orientation information, and transmits a drawing result to the mobile terminal 10.

Note that since image data (data of drawing result of virtual object) is continuously transmitted from the server 20 to the mobile terminal 10, use of a data link layer capable of securing a band may be assumed. Furthermore, since transmission from the mobile terminal 10 to the server 20 has a small data amount and is largely influenced by a communication delay, a data link layer with a lower delay may be assumed. For example, in a case where the server 20 is a cloud server and uses 5G for the network 30, transmission from the server 20 to the mobile terminal 10 may use (enhanced mobile broadband (eMBB), and transmission from the mobile terminal 10 to the server 20 may use ultra-reliable and low latency communications (URLLC). Furthermore, in a case where the server 20 is a smartphone, a notebook PC, or the like that can be carried around by the user wearing the mobile terminal 10 (e.g., Bluetooth (registered trademark) or Wi-Fi (registered trademark) may be used for the network 30, or a wired connection such as USB or Gigabit Ethernet may be used.

1-1. Configuration Example of Mobile Terminal 10

As illustrated in FIG. 1, the mobile terminal 10 includes a control unit 100, a sensor unit 110, a communication unit 120, a clock signal generation unit 130, a time stamp counter 140, a storage unit 150, and the display unit 160.

The communication unit 120 is communicably connected to the server 20, which is an external device, via the network 30 in a wired or wireless manner to transmit and receive data. For example, the communication unit 120 transmits position/orientation information of the mobile terminal 10. Furthermore, the communication unit 120 receives data of a drawing result of a virtual object from the server 20. The communication unit 120 may be, for example, a wired/wireless local area network (LAN), Wi-Fi (registered trademark), Bluetooth (registered trademark), a mobile communication network (long term evolution (LTE), third generation mobile communication system (3G), fourth generation mobile communication system (4G), or fifth generation mobile communication system (5G)), or the like.

More specifically, for example, the communication unit 120 may have a function of packetizing data to be transmitted according to a communication protocol and transmitting the packetized data to the server 20 under the control of the control unit 100. Furthermore, the communication unit 120 may have a function of diverting a packet transmitted according to a communication protocol to a delivery destination in the mobile terminal 10. The communication unit 120 can receive a clock signal for time synchronization from the server 20 in addition to the data of the drawing result of the virtual object.

The sensor unit 110 is various sensors that detect operation information of the mobile terminal 10. For example, the sensor unit 11 may be a camera or an inertial measurement unit (IMU). More specifically, the sensor unit 110 acquires sensing data for estimating the position and orientation of the head and the position and orientation of the eyeballs of the user who uses the mobile terminal 10. For example, in a case where the mobile terminal 10 is implemented by an HMD and is worn on the head of the user, the position and orientation of the mobile terminal 10 is estimated to be the position and orientation of the head of the user. The position and orientation of the eyeballs are detected by a sensor (camera, infrared sensor, or the like) fixed in the direction of the user's eyeballs inside the HMD.

The control unit 100 functions as an arithmetic processing device and a control device, and controls the overall operation in the mobile terminal 10 according to various programs. The control unit 100 is implemented by, for example, an electronic circuit such as a central processing unit (CPU) or a microprocessor. Furthermore, the control unit 100 may include a read only memory (ROM) that stores programs, operation parameters, and the like to be used, and a random access memory (RAM) that temporarily stores parameters and the like that change appropriately.

The control unit 100 according to the present embodiment is a display processing device that also functions as a position/orientation estimation unit 101, a data decoding unit 102, an image deformation unit 103, a position/orientation prediction unit 104, and a display control unit 105. The position/orientation estimation unit 101 estimates the position and orientation of the user on the basis of various types of sensing data detected by the sensor unit 110. Specifically, the position/orientation estimation unit 101 has a function of a so-called head tracker that estimates the position and orientation of the head of the user on the basis of a camera image obtained by imaging the surroundings and sensing data of the IMU acquired by the sensor unit 110. The position and orientation of the head may be a position and orientation on a coordinate system defined with respect to surrounding real space. Note that the head tracker includes an outside-in method using a sensor installed outside, an inside-out method using a sensor mounted on a measurement target itself (mobile terminal 10 (HMD)), and a hybrid method which is a combination thereof. Furthermore, the position/orientation estimation unit 101 also has a function of a so-called eye tracker that estimates the position and orientation of eyeballs (position of pupils, irises, or the like) of the user on the basis of an infrared camera image obtained by imaging the eyes of the user acquired by the sensor unit 110. The position and orientation of the eyeballs of the user are one type of line-of-sight information, and the eye tracker may further estimate a gaze point (coordinates) on a display screen of the display unit 160. The sensor unit 110 continuously performs sensing, and the control unit 100 continues to transmit position/orientation information (one example of first motion information) estimated by the position/orientation estimation unit 101 from the communication unit 120 to the server 20. On the server 20 side, an image generation unit 201 described later performs processing of drawing a virtual object on the basis of the position/orientation information (first motion information) received from the mobile terminal 10, and transmits the drawing result data to the mobile terminal 10. The data to be transmitted is encoded by a data encoding unit 203 described later.

The data decoding unit 102 decodes the drawing result data (including image data of virtual object) transmitted from the server 20, and outputs the decoded data to the image deformation unit 103. The image deformation unit 103 receives the output (including image data of virtual object) from the data decoding unit 102 and a prediction result based on the latest position/orientation information (one example of second motion information) by the position/orientation prediction unit 104 as an input, and performs image deformation so that the virtual object appears to be localized at a more correct position at the time when the image of the virtual object is displayed on the display unit 160. On the mobile terminal 10 side, delay compensation can be performed by performing image deformation on the image data of the virtual object received from the server 20 using a prediction result of position/orientation information. The result of the image deformation is output as pixel columns to the display unit 160 implemented by a scanned display. Details of the image deformation will be described later.

The position/orientation prediction unit 104 predicts the position/orientation information after a predetermined time on the basis of the latest position/orientation information (one example of second motion information) estimated by the position/orientation estimation unit 101. "After a predetermined time" is assumed to be a predicted display time of a slice to be subjected to image deformation using the prediction on the display unit 160. For example, the position/orientation prediction unit 104 calculates head position/orientation information $_wT_h(t)$ at future time t on the basis of head position/orientation information $_wT_h(t_h)$ estimated at time $t_h$ by the position/orientation estimation unit 101. Furthermore, the position/orientation prediction unit 104 calculates eyeball position/orientation information $_hT_e(t)$ future time t on the basis of eyeball position/orientation information $_hT_e(t_e)$ estimated at time $t_e$ by the position/orientation estimation unit 101.

The display control unit 105 performs control to display image data appropriately deformed by the image deformation unit 103 on the display unit 160. Details of the display processing will be described later.

The clock signal generation unit 130 acquires a clock signal (clock signal serving as reference of timing control of entire system) generated by a clock signal generation unit 230 of the server 20 using a clock propagation mechanism in the network 30, and refers to the clock signal to generate a clock signal synchronized with the server 20 in a phase locked loop (PLL). Note that regardless of whether wired or wireless communication connection is used between the mobile terminal 10 and the server 20, means for transmitting and receiving a reference clock signal is provided in the data link layer of the network 30. For example, in any of LTE, 5G, Bluetooth, and Wi-Fi, which can be used in the case of wireless connection, communication can be controlled by defining time slots with a time axis resolution of 1 ms or less, so that clock synchronization using the server 20 side as a reference clock is possible. Furthermore, in the case of wired connection, in a system such as USB in which a host controller performs timing control of the entire bus, clock synchronization using the server 20 as a reference clock is possible. Furthermore, in the case of Gigabit Ethernet (GbE), sufficiently accurate synchronization (between time stamp counters of mobile terminal 10 and server 20) is possible by using precision time protocol (PTP) in combination.

The time stamp counter 140 is a time counter for timing control of the entire system. The time stamp counter 140 may increase monotonically in principle, except for special cases such as initialization. At the time of system initialization, after the time stamp counter 140 of the mobile terminal 10 is initialized in accordance with the value of a time stamp counter 240 of the server 20, the values of the time stamp counter 140 and the time stamp counter 240 are synchronized with each other with sufficient accuracy (e.g., at least error of 1 ms or less) by advancing the counter using the reference clock signal generated by the clock signal generation unit 230 or the clock signal generation unit 130. The value of the time stamp counter 140 is referred to, for example, when the control unit 100 fetches sensing data from the sensor unit 110, and is used as a time stamp of the sensing data. Furthermore, regarding the display control of the display unit 160 implemented by a scanned display, the time stamp counter value is referred to at the scanning start timing of each frame (commonly called Vsync (vertical synchronizing signal)), and is used for estimation of the next scheduled VSync time.

Note that the above-described timing synchronization method and use thereof are merely examples, and the present disclosure is not limited thereto.

The storage unit 150 is implemented by a read only memory (ROM) that stores programs, operation parameters, and the like used for processing of the control unit 100, and a random access memory (RAM) that temporarily stores parameters and the like that change appropriately.

The display unit 160 is a display device that displays an image of a virtual object. Furthermore, the display unit 160 according to the present embodiment is implemented by a scanned display. The scanned display sequentially displays a plurality of slices (display areas) divided in a direction perpendicular to the scanning direction. That is, the scanned display has a plurality of adjacent display areas having different display timings (lighting time varies depending on position on screen). The slices will be described later with reference to FIG. 3. Also, more specifically, the scanned display displays pixel columns output from the image deformation unit 103. As the type of the scanned display, for example, the following two types are assumed.

One is a type in which the line to be scanned can be arbitrarily selected (i.e., scan order can be arbitrarily changed). Specific examples of the display include an organic light emitting diode (OLED) and a display using LED. In this type, the lighting time (hold time) of each pixel can also be changed. The other type is a type in which the line to be scanned cannot be arbitrarily selected (i.e., scan order cannot be arbitrarily changed). Specific examples of the display include a laser scanning type (LBS) display in which a laser light source and a MEMS mirror are combined.

Furthermore, the display unit 160 implemented by a scanned display may be an optical see-through display capable of directly delivering light in real space to the eyes of the user, or may be a non-transmissive display in which light in real space does not directly reach the eyes of the user. Furthermore, the display unit 160 may be a display that can be switched between art optical see-through display and a non-transmissive display. Furthermore, the display unit 160 may be provided in an HMD, or may be provided in a smartphone, a tablet terminal, or the like. Furthermore, the display unit 160 may be provided in a separate device that is communicably connected to the mobile terminal 10.

While the configuration of the mobile terminal 10 has been specifically described above, the configuration of the mobile terminal 10 according to the present disclosure is not limited to the example illustrated in FIG. 1. For example, the mobile terminal 10 may be implemented by a plurality of devices. Specifically, a display device implemented by an HMD or the like (corresponding to at least display unit 160) and an information processing terminal implemented by a smartphone, a tablet terminal, a PC, or the like (display processing device corresponding to at least control unit 100) may be included.

1-2. Configuration Example of Server 20

As illustrated in FIG. 1, the server 20 includes a control unit 200, a communication unit 220, the clock signal generation unit 230, the time stamp counter 240, and a storage unit 250.

The communication unit 220 is communicably connected to the mobile terminal 10 via the network 30 in a wired or wireless manner to transmit and receive data. For example, the communication unit 220 receives position/orientation information from the mobile terminal 10. Furthermore, the communication unit 220 transmits data of a drawing result of a virtual object generated by the control unit 200 to the mobile terminal 10. The communication unit 220 may be, for example, a wired/wireless local area network (LAN), Wi-Fi (registered trademark), Bluetooth (registered trademark), a mobile communication network (long term evolution (LTE), third generation mobile communication system (3G), fourth generation mobile communication system (4G), or fifth generation mobile communication system (5G)), or the like.

The control unit 200 functions as an arithmetic processing device and a control device, and controls the overall operation in the server 20 according to various programs. The control unit 200 is implemented by, for example, an electronic circuit such as a central processing unit (CPU) or a microprocessor. Furthermore, the control unit 200 may include a read only memory (ROM) that stores programs, operation parameters, and the like to be used, and a random access memory (RAM) that temporarily stores parameters and the like that change appropriately.

Furthermore, the control unit 200 according to the present embodiment also functions as the image generation unit 201, a position/orientation prediction unit 202, and the data encoding unit 203. The image generation unit 201 has a function of drawing a virtual object with reference to position/orientation information (head position/orientation information and eyeball position/orientation information) received from the mobile terminal 10 and outputting the virtual object as an image. In the case of VR, the image generation unit 201 draws virtual space viewed from a viewpoint position (user's viewpoint in virtual space) corresponding to the position/orientation information. Furthermore, the drawing result output from the image generation unit 201 may include distance information of the virtual object and speed information of the virtual object in addition to the RGB image. Furthermore, the image generation unit 201 may draw the virtual object with reference to the latest position/orientation prediction information by the position/orientation prediction unit 202. The position/orientation prediction unit 202 predicts the position/orientation information after a predetermined time on the basis of position/orientation information received from the mobile terminal 10. "After a predetermined time" is assumed to be a predicted display time on the mobile terminal 10. The drawing processing based on position/orientation prediction information can be said to be one of delay compensation.

The data encoding unit 203 encodes a drawing result output from the image generation unit 201. The control unit 200 transmits data encoded by the data encoding unit 203 from the communication unit 220 to the mobile terminal 10.

The clock signal generation unit 230 has a function of generating a clock signal serving as a reference of timing control of the entire system. The server 20 transmits a clock signal generated by the clock signal generation unit 230 from the communication unit 220 to the mobile terminal 10.

The time stamp counter 240 is a time counter for timing control of the entire system. The time stamp counter 240 advances the counter using a reference clock signal generated by the clock signal generation unit 230.

The storage unit 250 is implemented by a read only memory (ROM) that stores programs, operation parameters, and the like used for processing of the control unit 200, and a random access memory (RAM) that temporarily stores parameters and the like that change appropriately.

While the configuration of the server 20 has been specifically described above, the configuration of the server 20 according to the present disclosure is not limited to the example illustrated in FIG. 1. For example, the server 20 may be implemented by a plurality of devices.

2. SUMMARY OF PROBLEMS

Here, since higher definition drawing processing increases power consumption and leads to an upsizing of a heat dissipation mechanism of a terminal that performs the drawing processing and an increase in the battery capacity, it is possible to achieve downsizing and weight reduction of the mobile terminal 10 by drawing a virtual object by the server 20 as in the present embodiment. However, in a case where the processing of drawing a virtual object is performed by an external device such as the server 20, the delay increases due to communication or compression and expansion of an image as compared with a case where the processing is performed by the mobile terminal 10 alone, and there is a possibility that the localization sensation of the virtual object when the virtual object is displayed on the mobile terminal 10 is impaired.

Figure 2:
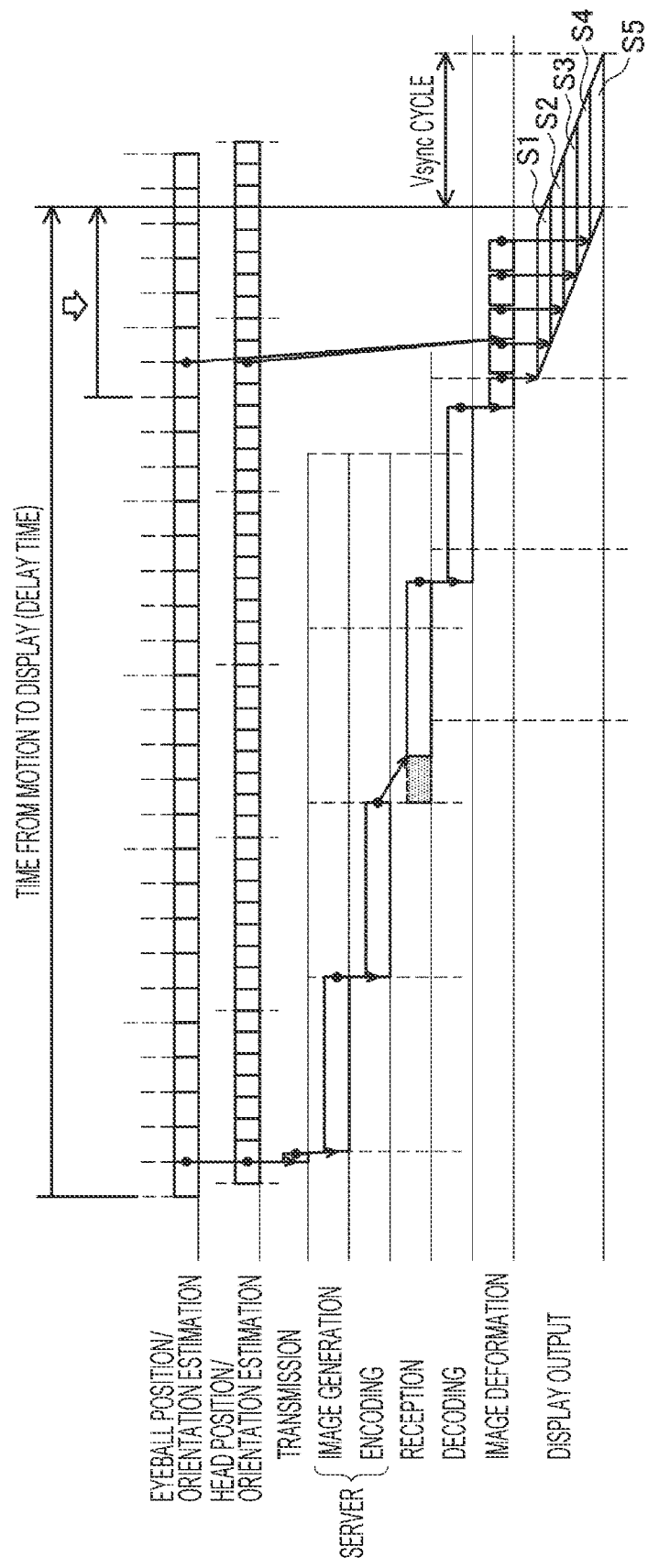
FIG. 2 is a diagram for describing the length of delay in a case where drawing processing is performed by an external device.

FIG. 2 is a diagram for describing the length of delay in a case where drawing processing is performed by an external device. In the example illustrated in FIG. 2, first, the position and orientation of the eyeballs and the head of the user are estimated by various sensors (eye tracker and head tracker) provided in a mobile terminal such as an HMD worn on the head of the user, and the position/orientation information is transmitted to a server that is an external device (upstream transfer). The server performs drawing processing of the virtual object (i.e., image generation of virtual object) on the basis of the received position/orientation information (rendering function), encodes (compresses) the virtual object image (performs video encoding), and transmits the data to a mobile terminal. When receiving the data (downstream transfer), the mobile terminal decodes (decompresses) the encoded data (performs video decoding). Thus far, a delay due to communication and data encoding and decoding (lapse of time from acquisition time of position/orientation information used to draw virtual object) has already occurred. Since time has elapsed from the time when the position/orientation information used to draw the virtual object is acquired, if there is movement on the mobile terminal side during that time, the localization sensation of the virtual object displayed on the mobile terminal may be impaired. That is, in the case of AR, the display position and the orientation of the virtual object to be superimposed and displayed are shifted from those in real space, and even in a case where a video see-through display is used, the display position and the orientation of the virtual object to be superimposed and displayed are shifted from those in the video in real space. Furthermore, in the case of VR, the video of virtual space does not follow (or follows with delay) the motion of the user, and a sense of discomfort or unnaturalness occurs, whereby the sense of immersion in virtual space is impaired.

Figure 3:
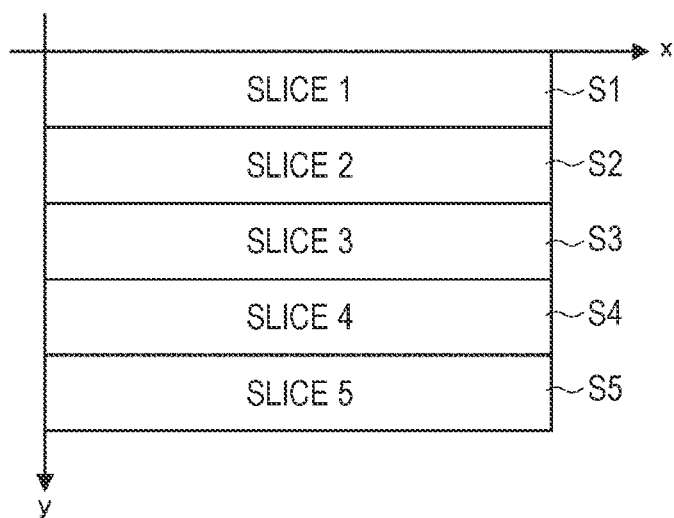
FIG. 3 is a diagram for describing slices in a scanned display.

Note that in a case where the display unit included in the mobile terminal is assumed to be a scanned display, the mobile terminal sequentially displays a plurality of slices (display areas) divided in a direction perpendicular to the scanning direction. FIG. 3 is a diagram for describing slices the scanned display. As illustrated in FIG. 3, the scanned display is divided into, for example, five slices (display areas) in a direction (y-axis direction in drawing) perpendicular to a scanning direction (x-axis direction in drawing). The boundary between the slices is provided substantially parallel to the scanning direction. The slices are sequentially subjected to display processing along with the scanning. That is, the scanned display has a plurality of adjacent display areas having different display timings (lighting time varies depending on position on screen). For example, display processing is sequentially performed from slice 1 (S1) to slice 5 (S5). The mobile terminal divides data of a drawing result of a virtual object received from the server into five slices, sequentially scans the slices, and displays and outputs the data. At this time, the mobile terminal can reduce the display delay felt by the user by performing image deformation for each slice on the basis of the position/orientation information of the mobile terminal acquired immediately before performing the display output of each slice. Examples of image deformation include time warping and distortion correction.

However, when the drawing processing is performed by an external device, the delay due to communication and data encoding and decoding is large, and delay compensation of image deformation at the time of display output is not sufficient. For example, assuming that eyeball position/orientation estimation (eye tracker) is a 300 frames per second (fps) operation and the processing time is 3.33 ms, assuming that head position/orientation estimation (head tracker) takes 2 ms processing time, assuming that a communication delay (uplink latency) of the mobile terminal in transmission to the server is 1 ms of 5G URLLC, assuming that a communication delay (downlink latency) of the mobile terminal in reception from the server is 4 ms of 5G eMBB, assuming that the processing delay of compression, network transfer, and extension is 16.7 ms at a throughput of 60 fps, and assuming that a Vsync cycle of the scanned display is 16.7 ms, a delay (motion-to-photon latency) from acquisition (detection by sensor) of the position/orientation information of the mobile terminal to display is about 95 ms (5.7 V). Note that the "display" time of "to display" is based on a display timing of a representative point, for example, with the center point of one frame as the representative point (corresponding to center of slice 3 located at center in a case where scanned display is equally divided into five). In the example illustrated in FIG. 2, drawing and transmission of drawing result data are performed in units of one frame, and although it is possible to shorten the time to about 18 ms (1.1 V) by time warping, the compensation period (in this example, about 95 ms (5.7 V)) is long, and distortion is likely to occur.

Therefore, the present disclosure proposes a display processing system capable of reducing a delay in a case where data of a virtual object generated by an external device is received and displayed.

Hereinafter, technical features of the display processing system according to one embodiment of the present disclosure will be described.

3. TECHNICAL FEATURES

The display processing system according to the present embodiment has the configuration illustrated in FIG. 1 and implements a mechanism for more appropriately reducing a delay in a case where the mobile terminal 10 receives and displays data of a virtual object generated by the server 20 which is an external device. Specifically, in the image generation unit 201 of the server 20, one frame is divided into a plurality of display areas (referred to as slices in present specification), drawing is performed for each slice, and the slices are sequentially compressed and transmitted at the time point when drawing of each slice is completed. That is, while drawing, encoding, and transmission are performed in units of one frame in the example illustrated in FIG. 2, in the display processing system according to the present embodiment, drawing, encoding, and transmission are performed in units of slices. Furthermore, in the mobile terminal 10, too, decoding, image deformation, and display output are sequentially performed in units of received slices. As described above, in the display processing system according to the present embodiment, by performing pipeline processing for drawing, transmission, deformation, and display output in units of slices, it is possible to shorten the delay time (motion-to-photon latency) from acquisition of the position/orientation information to display. Hereinafter, a specific description will be given with reference to FIG. 4.

3-1. Processing in Units of Slices

Figure 4:
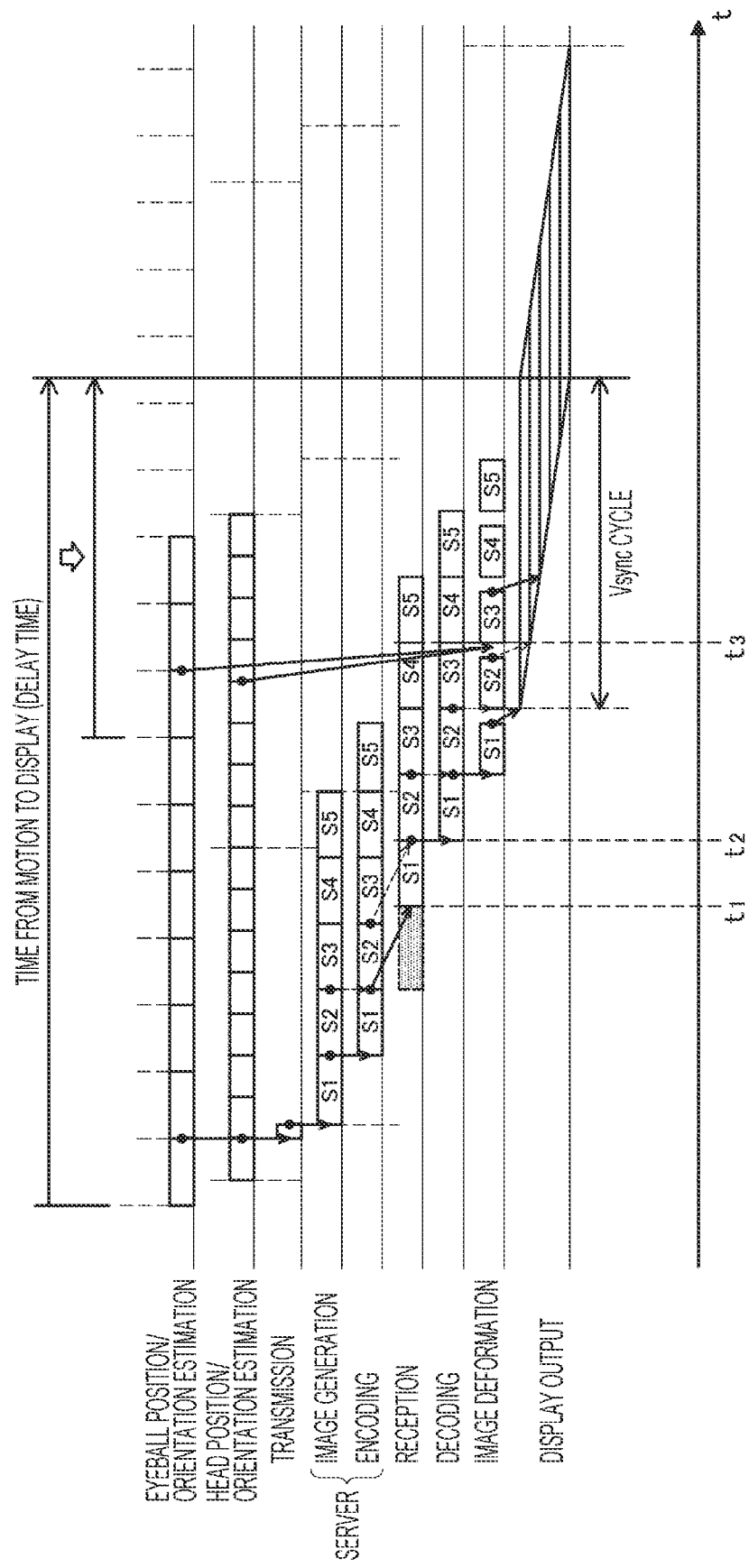
FIG. 4 is a diagram for describing a sequential flow of processing in units of slices according to the present embodiment.

FIG. 4 is a diagram for describing a sequential flow of processing in units of slices according to the present embodiment. As illustrated in FIG. 4, in the display processing system according to the present embodiment, in image generation of the server 20 (virtual object drawing processing in image generation unit 201), one frame is divided into a plurality of slices to perform drawing sequentially, sequential encoding and transmission (received by mobile terminal 10) are performed in units of slices, and image deformation and display output in units of slices are also performed in the mobile terminal 10. The number and size of the slices to be divided are not particularly limited. As one example, the image generation unit 201 of the server 20 may equally divide one frame. For example, as illustrated in FIG. 3, the image generation unit 201 divides one frame into five display areas of slice 1 to slice 5, and sequentially performs drawing from slice 1.

Note that the image generation unit 201 refers to the position information prediction result predicted by the position/orientation prediction unit 202 on the basis of position/orientation information (one example of first motion information) received from the mobile terminal 10, and draws the virtual object for each slice.

The communication unit 120 of the mobile terminal 10 receives data of slice 1 (first display area) at first time $t_1$. Furthermore, the communication unit 120 of the mobile terminal 10 receives data of slice 2 (second display area) adjacent to slice 1 (first display area) at second time $t_2$ later than first time. After starting the display output of the data of slice 1 (first display area) to the display unit 160, the display control unit 105 of the mobile terminal 10 performs control to start the display output of the data of slice 2 (second display area) as one frame together with the data of slice 1.

Furthermore, illustrated in FIG. 4, the communication unit 120 of the mobile terminal 10 receives data of a third display area (e.g., slice 5) corresponding to a part of one frame drawn by the server 20 at third time $t_3$ later than second time $t_2$. The display control unit 105 of the mobile terminal 10 starts displaying the data of slice 1 (first display area) at a time earlier than third time $t_3$, and also starts displaying the data of slice 5 (third display area) later than the start of displaying the data of slice 2 (second display area). In this manner, the first display area is started to be displayed at least before third time, and the mobile terminal 10 can start displaying without waiting for drawing or reception of all of one frame. Hence, the delay time can be shortened. Here, while "slice 5" has been described as "third display area" as one example, the present embodiment is not limited thereto. "Third display area" corresponds to a display area other than the first display area corresponding to a part of one frame drawn by the server 20 and the second display area adjacent to the first display area. For example, in the example illustrated in FIG. 4, "third display area" may be "slice 4" or "slice 3". Furthermore, while first time to third time are reception times when the drawing result data is received from the server 20 in this example, the present embodiment is not limited thereto. For example, first time to third time may be times when the server 20 transmits the drawing result data to the mobile terminal 10, times when the mobile terminal 10 decodes the drawing result data received from the server 20, or times when the image is deformed.

Note that the image generation unit 201 of the server 20 can draw the virtual object for each slice on the basis of a position information prediction result predicted by the position/orientation prediction unit 202 on the basis of the position/orientation information (one example of first motion information) received from the mobile terminal 10. Furthermore, the drawing result in units of slices by the image generation unit 201 includes an RGB image, distance information of the virtual object, and speed information of the virtual object. The distance information of the virtual object and the speed information of the virtual object can be used in image deformation (one of delay compensation) performed by the image deformation unit 103 in the mobile terminal 10 described later.

Furthermore, in image deformation by the image deformation unit 103 of the mobile terminal 10, it is possible to reduce the display delay felt by the user by performing image deformation for each slice with reference to the position/orientation information (one example of second motion information) acquired immediately before and the prediction result based on the position/orientation information. Examples of image deformation include time warping and distortion correction.

When a more specific numerical value is used for the reduction in delay time by execution of pipeline processing in units of slices, for example, in a case where various numerical values described above with reference to FIG. 2 are assumed, the delay from acquisition (detection by sensor) of position/orientation information of the mobile terminal 10 to the display is about 42 ms (2.7 V). In this case, for example, even if the delay is shortened to about 18 ms (1.1 V) by time warping, since the compensation period is shorter than that in the example illustrated in FIG. 2 (in this example, about 42 ms (2.7 V)), distortion hardly occurs. That is, it can also be said that distortion is less likely to occur when the period shortened by image deformation exceeds a predetermined value with respect to the compensation period.

Figure 5:
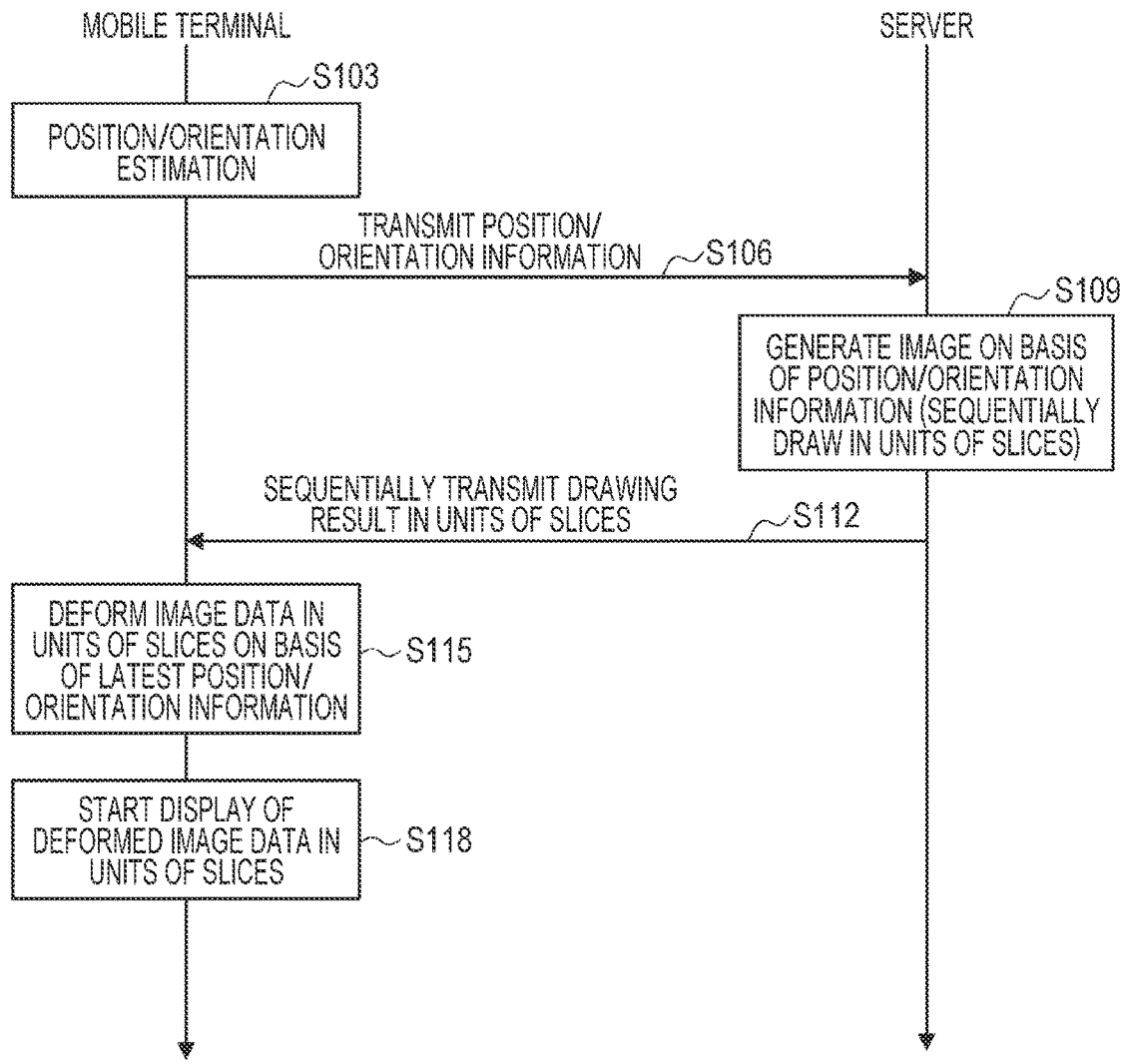
FIG. 5 is a sequence diagram illustrating one example of a flow of display processing in units of slices of the display processing system according to the present embodiment.

FIG. 5 is a sequence diagram illustrating one example of a flow of display processing in units of slices of the display processing system according to the present embodiment. As illustrated in FIG. 5, first, the position/orientation estimation unit 101 of the mobile terminal 10 estimates the position and orientation of the head and the eyeballs of the user on the basis of sensing data of the sensor unit 110 (step S103), and transmits the estimated position/orientation information to the server 20 (step S106).

Next, the image generation unit 201 of the server 20 performs image generation (drawing processing) of the virtual object in units of slices on the basis of the received position/orientation information (first motion information) (step S109). At this time, the image generation unit 201 may draw the virtual object with reference to a position/orientation information prediction result of a predetermined time predicted by the position/orientation prediction unit 202 on the basis of the received position/orientation information.

Next, the server 20 sequentially transmits data of the drawing result in units of slices to the mobile terminal 10 (step S112). Specifically, the server 20 sequentially encodes the data of the drawing result in units of slices output from the image generation unit 201 by the data encoding unit 203, and transmits the encoded data from the communication unit 220 to the mobile terminal 10. The mobile terminal 10 sequentially decodes the received data of the drawing result in units of slices.

Next, the image deformation unit 103 of the mobile terminal 10 deforms the image data (image data of virtual object in units of slices) included in the received drawing result in units of slices on the basis of the latest position/orientation information (second motion information) (step S115). At this time, the image deformation unit 103 may perform image deformation with reference to a position/orientation information prediction result of a predetermined time (scheduled display time) predicted by the position/orientation prediction unit 104 on the basis of the latest position/orientation information.

Then, the display control unit 105 of the mobile terminal 10 starts display of the image data in units of slices subjected to image deformation (step S118). The data of the drawing result in units of slices is sequentially transmitted from the server 20, and the mobile terminal 10 performs decoding, image deformation, and display processing in units of slices.

As described above, in the present embodiment, by performing pipeline processing for drawing, transmission/reception, deformation, and display output in units of slices, it is possible to shorten a delay time from acquisition of position/orientation information to display.

3-2. Priority Processing

While the above example describes a case where slices 1 to 5 obtained by dividing one frame are sequentially processed from the top (in order of slice 1, slice 2, slice 3, slice 4, and slice 5), the processing order is not limited thereto. For example, it is also possible to shorten the perceived delay by preferentially performing processing from an area important to the user, such as the vicinity of the gaze point on the screen.

Figure 6:
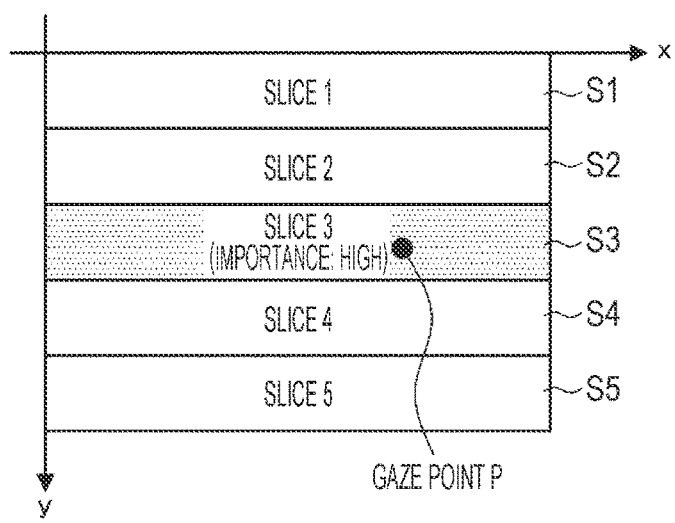
FIG. 6 is a diagram for describing the importance of slices according to a gaze point according to the present embodiment.

The importance of an area can be obtained from the content displayed in the screen or the line-of-sight direction of the user (or gaze point on screen). For example, the image generation unit 201 of the server 20 obtains the importance distribution in one frame on the basis of the content to be displayed in one frame or the line-of-sight direction of the user (or gaze point on screen), and determines the division of the areas and the drawing order. For example, the image generation unit 201 divides the display area into slices around the gaze point at which the user gazes in the screen, and further determines the drawing priority of each slice. The gaze point is obtained from position/orientation information (e.g., position/orientation information of eyeballs) transmitted from the mobile terminal 10. FIG. 6 is a diagram for describing the importance of slices according to the gaze point according to the present embodiment. For example, as illustrated in FIG. 6, the image generation unit 201 divides the display area into five slices around a gaze point P, and sets the importance of slice 3 including the gaze point P to be the highest.

Case where Scanning Line Can Be Arbitrarily Changed

In a case where the display unit 160 of the mobile terminal 10 is a display of a type in which the scanning line can be arbitrarily changed, the image generation unit 201 sets a higher demand toward the gaze point P, and determines the order of the demand to be, for example, slice 3, slice 4, slice 2, slice 5, and slice 1. Then, drawing, encoding, transmission/reception, decoding, image deformation, and display processing are performed in this order.

Figure 7:
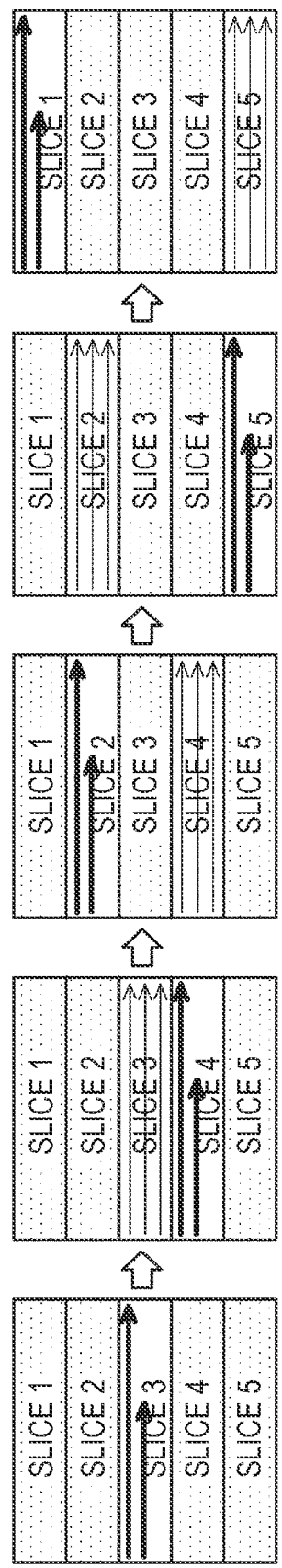
FIG. 7 is a diagram for describing the display order of slices in priority processing according to the present embodiment.

FIG. 7 is a diagram for describing the display order of slices in the priority processing according to the present embodiment. Since each processing from drawing to display output according to the present embodiment is executed by pipeline processing, in a case where the processing is performed in the above order, the display unit 160 performs the display processing in the order of slice 3, slice 4, slice 2, slice 5, and slice 1 as illustrated in FIG. 7. In this case, it is possible to shorten the delay of the important area (area of slice 3 in this example) as compared with a case where the area is simply divided and displayed from the upper part of the screen.

Figure 8:
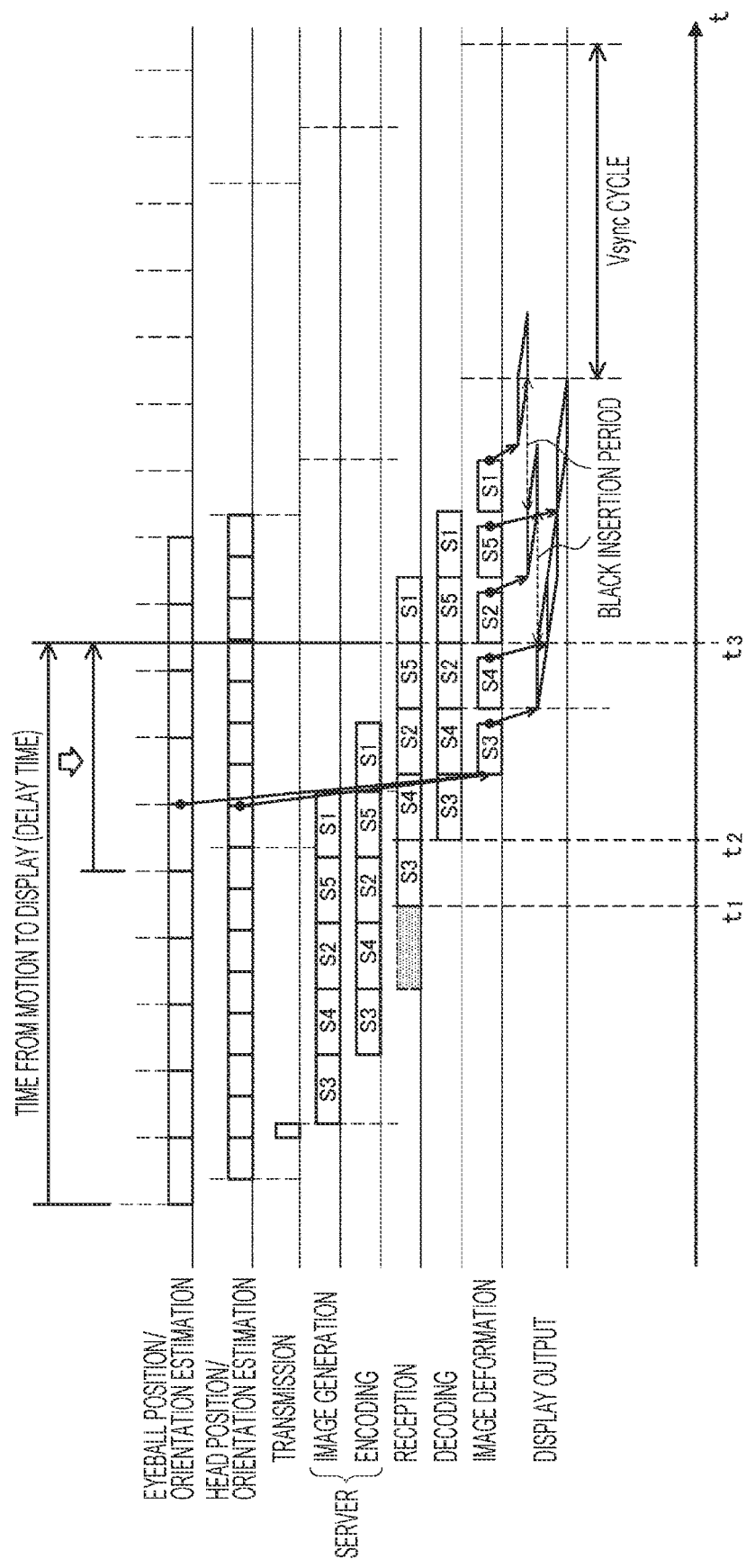
FIG. 8 is a diagram for describing a sequential flow of preferentially performing processing in units of slices in an arbitrary order according to the present embodiment.

FIG. 8 is a diagram for describing a sequential flow of preferentially performing processing in units of slices in an arbitrary order according to the present embodiment. As illustrated in FIG. 8, for example, drawing, encoding, reception, decoding, image deformation, and display output are performed in the order of slice 3, slice 4, slice 2, slice 5, and slice 1 on the basis of the importance according to the gaze point.

The communication unit 120 of the mobile terminal 10 receives data of slice 3 (one example of first display area) located in the area including the gaze point at first time $t_1$. Furthermore, the communication unit 120 of the mobile terminal 10 receives data of slice 4 (one example of second display area) adjacent to slice 3 at second time $t_2$ later than first time. After starting the display output of the data of slice 3 (first display area) to the display unit 160, the display control unit. 105 of the mobile terminal 10 performs control to start the display output of the data of slice 4 (second display area) as one frame together with the data of slice 1.

Furthermore, as illustrated in FIG. 8, the communication unit 120 of the mobile terminal 10 receives data of a third display area (here, for example, slice 1) corresponding to a part of one frame drawn by the server 20 at third time $t_3$ later than second time $t_2$. The display control unit 105 of the mobile terminal 10 starts displaying the data of the 3 (first display area) at a time earlier than third time $t_3$, and also starts displaying the data of slice 1 (third display area) later than the start of displaying the data of slice 4 (second display area). In this manner, the first display area is started to be displayed at least before third time, and the mobile terminal 10 can start displaying without waiting for drawing or reception of all of one frame. Hence, the delay time can be shortened.

At this time, the delay from the acquisition (detection by sensor) of position/orientation information of the mobile terminal 10 to the display (display of slice 3 which is important area) is, for example, about 28 ms (1.7 V) in a case where various numerical values described above with reference to FIG. 2 are assumed, and the delay is made even shorter than the example described with reference to FIG. 4. Furthermore, for example, it is also possible to shorten the delay to about 10 ms (0.6 V) by time warping.

Note that the display control unit 105 of the mobile terminal 10 may shorten the hold time of each pixel in the display output in the case of a display of a type in which the scanning line can be arbitrarily changed. For example, in the example illustrated in FIG. 8, a duty ratio of 20% (=3.3 ms) is assumed. This makes it possible to make a phenomenon called tearing occurring at the boundary between slices less visible. Tearing is a phenomenon in which a video image appearing on one screen appears to be shifted in the middle (at slice dividing line), and is also referred to as screen tearing. As will be described in detail later, for example, in a case where display output is performed in the order illustrated in FIG. 7, when adjacent slices are drawn in an order opposite to the scanning direction, such as the slice 2 being displayed after the slice 3, it is possible to make the tearing at the slice boundary less noticeable by turning off (shortening hold time of) slice 3 displayed earlier to secure a time for black insertion and then turning on slice 2.

Figure 9:
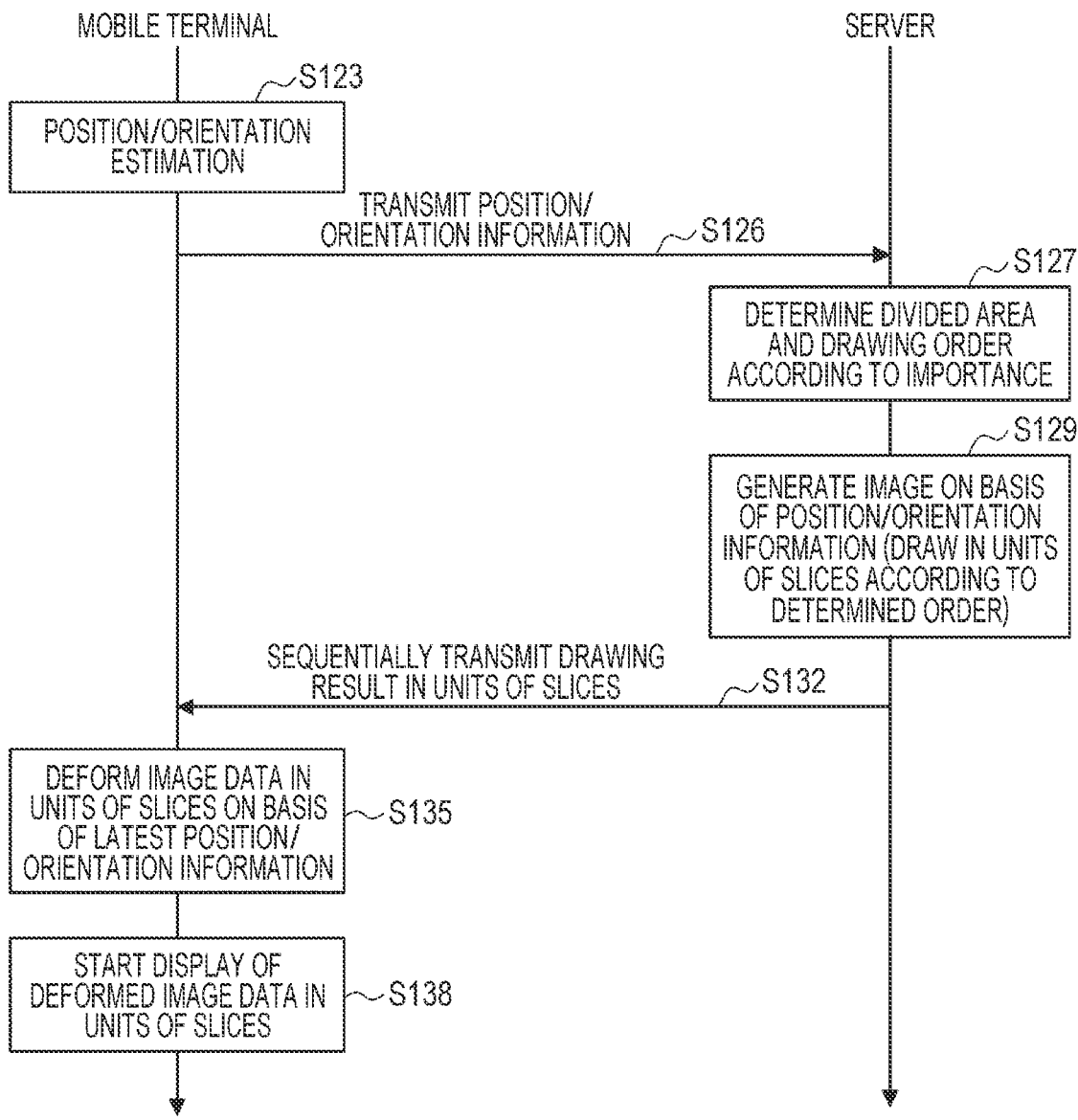
FIG. 9 is a sequence diagram illustrating one example of a flow of display processing of preferentially performing processing in units of slices in an arbitrary order according to the present embodiment.

FIG. 9 is a sequence diagram illustrating one example of a flow of display processing of preferentially performing processing in units of slices in an arbitrary order according to the present embodiment. As illustrated in FIG. 9, first, the position/orientation estimation unit 101 of the mobile terminal 10 estimates the position and orientation of the head and the eyeballs of the user on the basis of sensing data of the sensor unit 110 (step S123), and transmits the estimated position/orientation information to the server 20 (step S126).

Next, the image generation unit 201 of the server 20 determines divided areas and a drawing order (slice drawing order) according to the importance (step S127). The importance may be obtained, for example, according to a gaze point on the screen identified from the position/orientation information transmitted from the mobile terminal 10. Note that the information on the gaze point on the screen may be identified by the mobile terminal 10 and transmitted to the server 20.

Subsequently, the image generation unit 201 performs image generation (drawing processing) of the virtual object in units of slices according to the determined order on the basis of the received position/orientation information (first motion information) (step S129). At this time, the image generation unit 201 may draw the virtual object with reference to a position/orientation information prediction result of a predetermined time predicted by the position/orientation prediction unit 202 on the basis of the received position/orientation information.

Next, the server 20 sequentially transmits data of the drawing result in units of slices to the mobile terminal 10 (step S132). Specifically, the server 20 sequentially encodes the data of the drawing result in units of slices output from the image generation unit 201 by the data encoding unit 203, and transmits the encoded data from the communication unit 220 to the mobile terminal 10. The mobile terminal 10 sequentially decodes the received data of the drawing result in units of slices. Note that the operations are carried out by pipeline processing in the determined order.

Next, the image deformation unit 103 of the mobile terminal 10 deforms the image data (image data of virtual object in units of slices) included in the received drawing result in units of slices on the basis of the latest position/orientation information (second motion information) (step S135). At this time, the image deformation unit 103 may perform image deformation with reference to a position/orientation information prediction result of a predetermined time (scheduled display time) predicted by the position/orientation prediction unit 104 on the basis of the latest position/orientation information.

Then, the display control unit 105 of the mobile terminal 10 starts display of the image data in units of slices subjected to image deformation (step S138). The data of the drawing result in units of slices is sequentially transmitted from the server 20, and the mobile terminal 10 performs decoding, image deformation, and display processing in units of slices.

As described above, in the present embodiment, when pipeline processing of drawing, transmission/reception, deformation, and display output is performed in units of slices, by starting drawing in units of slices in the order determined according to the importance based on the gaze point or the like, it is possible to preferentially display a slice with a high importance, and it is possible to further shorten the display delay perceived by the user.

Case where Scanning Line Cannot Be Arbitrarily Changed

Figure 10:
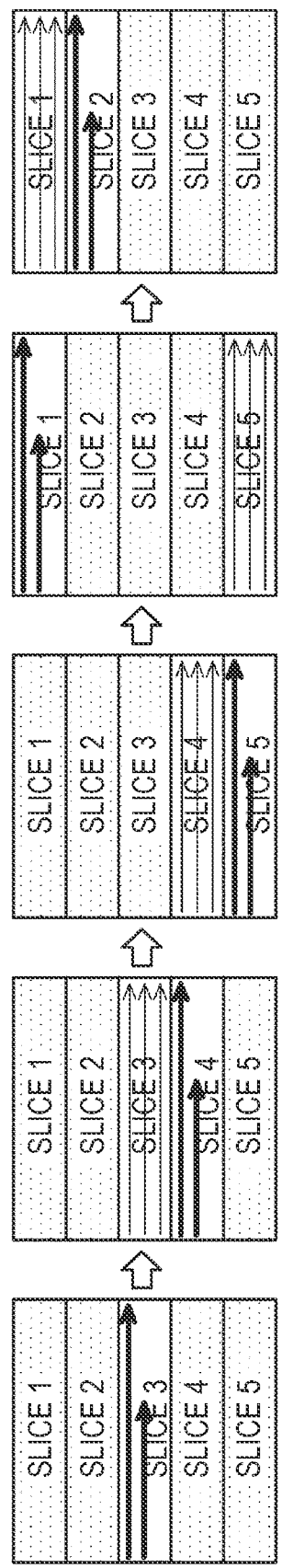
FIG. 10 is a diagram for describing another display order of slices in the priority processing according to the present embodiment.

In a case where the display unit 160 of the mobile terminal 10 is a display of a type in which the scanning line cannot be arbitrarily changed, the image generation unit 201 sets, for example, a slice of an area having the highest importance according to the gaze point P as to the top of the drawing processing. As a result, for example, in a case where the importance of slice 3 is the highest, it is possible to start the display output with slice 3 at the top (preferentially) as illustrated in FIG. 10. The display processing may then be performed in the order of slice 4, slice 5, slice 1, and slice 2. After slice 2, slice 3 of the next frame is displayed.

In this way, by preferentially dig-playing a slice with a high importance, it is possible to further shorten the display delay perceived by the user. Hereinafter, a specific description will be given with reference to FIG. 11.

Figure 11:
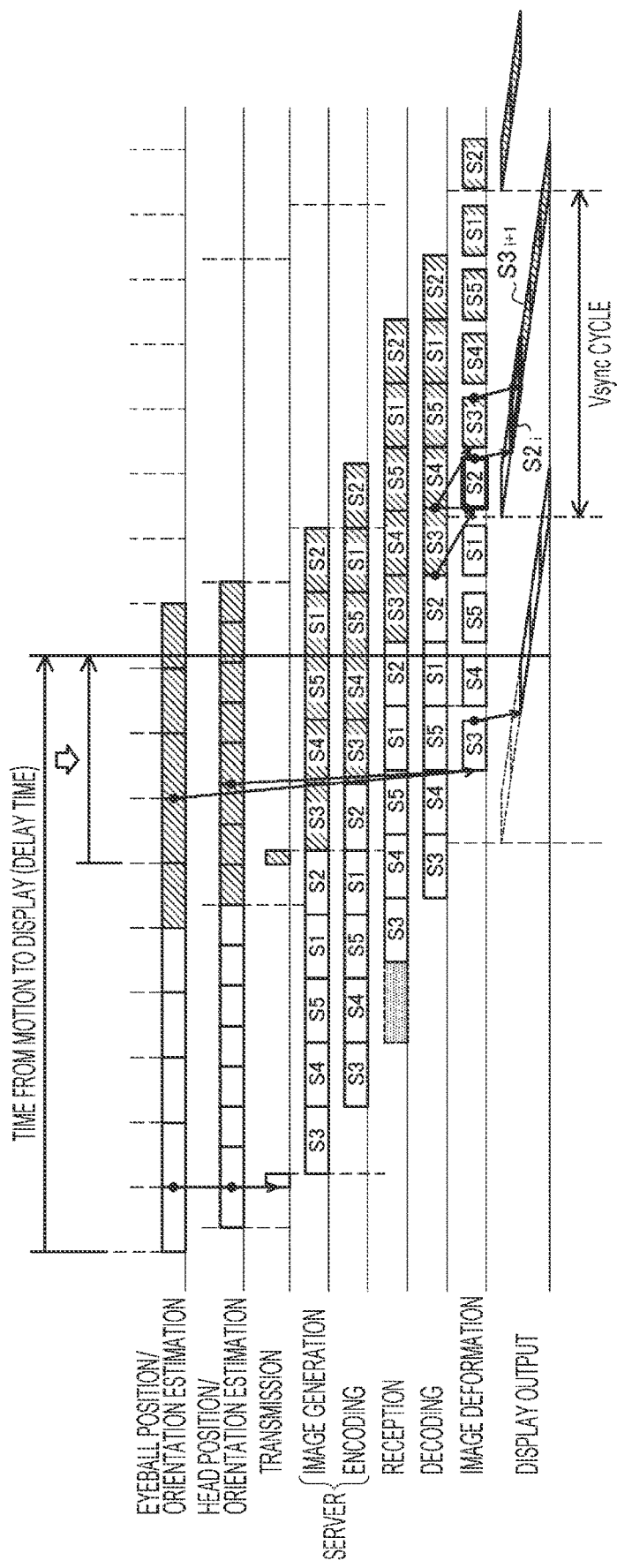
FIG. 11 is a diagram for describing a sequential flow of processing a slice with a high importance at the top in the processing in units of slices according to the present embodiment.

FIG. 11 is a diagram for describing a sequential flow of processing a slice with a high importance a the top in the processing in units of slices according to the present embodiment. As illustrated in FIG. 11, on the basis of position/orientation information of the eyeballs and the head transmitted from the mobile terminal 10, the server 20 performs drawing processing in the order of: slice 3 with a high importance according to the gaze point at the top, slice 4, slice 5, slice 1, and slice 2, for example. Furthermore, subsequent encoding, reception, decoding, image deformation, and display output processing is performed in pipelined processing in the order of slice 3, slice 4, slice 5, slice 1, and slice 2. As a result, the delay from the acquisition (detection by sensor) of position/orientation information of the mobile terminal 10 to the display (display of slice 3 which is important area) is, for example, about 30 ms (1.8 V) in a case where various numerical values described above with reference to FIG. 2 are assumed, and the delay is made even shorter than the example described with reference to FIG. 4. Furthermore, for example, it is also possible to shorten the delay to about 8.3 ms (0.5 V) by time warping.

Note that here, in a case where any slice after slice 2 among a plurality of slices forming one frame is set as the head, such as in the order of slice 3, slice 4, slice 5, slice 1, and slice 2, tearing may occur at the boundary of the slices. In particular, in a case where processing of drawing, transmission, and display is performed in order from an area important to the user, such as the vicinity of the gaze point, there is a possibility that the tearing is easily noticeable. In the example illustrated in FIG. 11, since slice 3 is set at the top of the drawing processing, tearing may occur between (at boundary of) slice 2 of the i-th frame and slice $3_{i+1}$ of the frame. In this case, although details will be described later, it is possible to make the tearing between the slices less noticeable by performing image deformation such that the contour of the virtual object crossing the boundary appears to be continuous. In the example illustrated in FIG. 11, in the image deformation unit 103 of the mobile terminal 10, on the basis of slice $2_i$ of the i-th frame and slice $3_{i+1}$ of the i+1-th frame, slice $2_i$ is image-deformed such that the contour of the virtual object crossing the boundaries of these slices appears to be continuous.

Hereinafter, the curbing of tearing according to the present embodiment will be specifically described.

3-3. Curbing Tearing

3-3-1 Black Insertion Period

As a first countermeasure, there is control in which the display control unit 105 of the mobile terminal 10 shortens the lighting time (shortens hold time) of each pixel corresponding to the area of each slice. As a result, when a slice (third slice) adjacent to the previously displayed slice (first slice) on the opposite side in the scanning order (e.g., from upper side to lower side of screen) direction is displayed, a time for black insertion by turning off is secured. Specifically, when the display control unit 105 determines the display order, it is possible to create a black insertion period by separating update timings of adjacent slices.

For example, in the example illustrated in FIG. 8, when slice 2 (third slice) adjacent to slice 3 (first slice) on the opposite side in the scanning order direction is displayed, a black insertion period is provided. Each slice to be displayed is subjected to image deformation on the basis of the latest position/orientation information or prediction for each slice by the image deformation unit 103. Therefore, for example, when image deformation and display are performed in the order of slice 3, slice 4, slice 2, slice 5, and slice 1, there is a possibility that the contour of the virtual object crossing the boundary between slice 2 and slice 3 is shifted. In such a case, if there is a period in which slice 3 and slice 2 are displayed at the same time, the deviation in the contour may be conspicuous. Furthermore, since slice 3 is an important area for the user, particularly in the vicinity of the gaze point, there is a possibility that the tearing is easily noticeable.

Therefore, as described above, by shortening the lighting time (hold time) of each pixel, for example, it is possible to provide a black insertion period between slice 3 and slice 2 without forming a period in which slice 3 and slice 2 are displayed at the same time. As a result, it is possible to make it difficult for the user to perceive tearing such as deviation of the contour of the virtual object, and it is possible to provide the user with a more comfortable viewing experience.

3-3-2. Image Deformation

As a second countermeasure, the image deformation unit 103 of the mobile terminal 10 may deform the contour line of the virtual object. Specifically, the image deformation unit 103 performs image deformation on the basis of the image data of two adjacent slices such that the contour line of the virtual object crossing the boundary between these slices is continuous.

In particular, as described with reference to FIG. 11, in a case where an important slice determined according to a gaze point or the like is set as the top of the drawing processing in the case of a type of display in which the scan line cannot be arbitrarily selected, there is a high possibility that tearing occurs between (at boundary of) the slice displayed at the end of the i-th frame (e.g., slice $2_i$) and the slice displayed at the beginning of the i+1-th frame (e.g., slice $3_{i+1}$). In this case, the image deformation unit 103 can curb the tearing by deforming the contour line of the virtual object of slice $2_i$ to be continuous with the contour line of slice $3_{i+1}$.

Furthermore, the method of deforming the contour line of the virtual object described here may be applied to the case of displaying slices in an arbitrary order according to the distribution of the importance according to the gaze point or the like in the case of the display of a type in which the scanning line is arbitrarily selected as described with reference to FIG. 8.

Hereinafter, a specific description will be given with reference to FIGS. 12 to 16.

Figure 12:
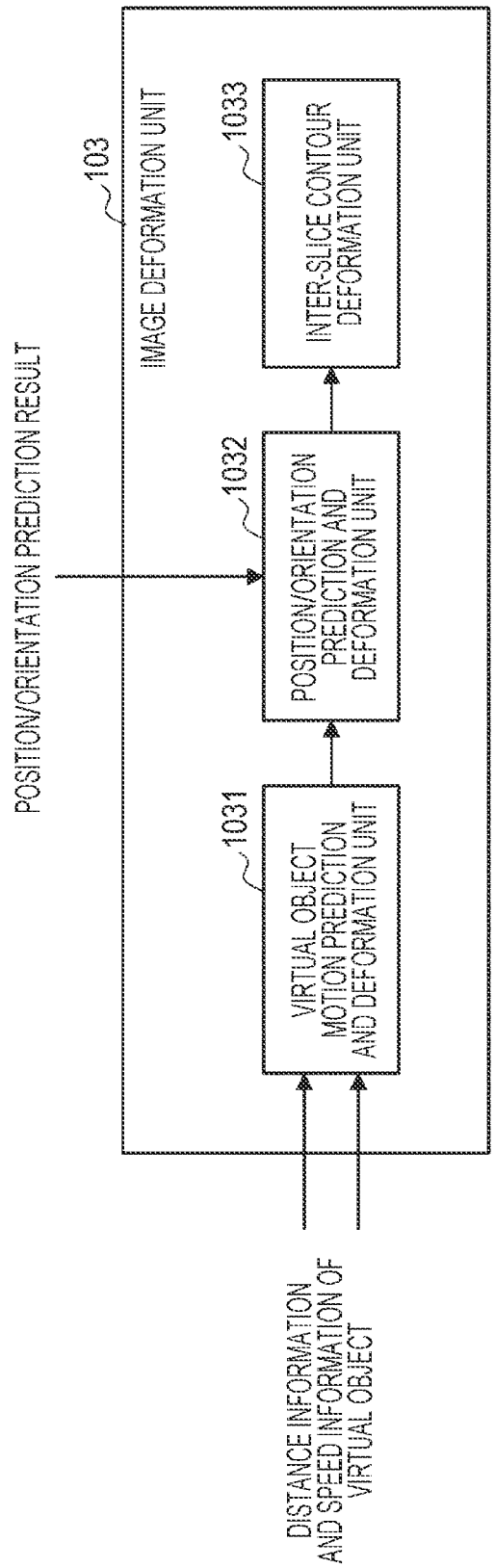
FIG. 12 is a block diagram illustrating one example of a functional configuration of an image deformation unit according to the present embodiment.

FIG. 12 is a block diagram illustrating one example of a functional configuration of the image deformation unit 103 according to the present embodiment. As illustrated in FIG. 12, the image deformation unit 103 functions as a virtual object motion prediction and deformation unit 1031, a position/orientation prediction and deformation unit 1032, and an inter-slice contour deformation unit 1033. Note that the virtual object motion prediction and deformation unit 1031, the position/orientation prediction and deformation unit 1032, and the inter-slice contour deformation unit 1033 all perform deformation in units of slices.

First, image data (RGB image) included in a drawing result transmitted from the server 20 in units of slices and distance information and speed information of a virtual object included in the drawing result are input to the image deformation unit 103. Here, FIG. 13 illustrates one example of an image generated in units of slices by the image generation unit 201 of the server 20.

As illustrated in FIG. 13, the image generation unit 201 draws the i-th frame in units of slices in consideration of the motion of a user U and the motion of a virtual object 30, and then draws the i+1-th frame in units of slices consideration of a newly acquired motion of the user U and motion of the virtual object 30. As described above, the movement of the user U can be considered by referring to position/orientation information transmitted from the mobile terminal 10 or position/orientation information after a predetermined time (predicted display time) predicted by the position/orientation prediction unit 202 on the basis of the position/orientation information. Furthermore, when drawing the virtual object 30 in units of slices, the image generation unit 201 may consider speed information of the virtual object 30 and distance information from the user U to the virtual object 30.

Note that in the example illustrated on the right in FIG. 13, slice 3 including the gaze point P is set at the top of the drawing processing in order to shorten the display delay, and the data is sequentially drawn in units of slices in the order of slice 3, slice 4, slice 5, slice 1, and slice 2. Furthermore, since the image generation unit 201 draws according to the movement of the virtual object 30 at the time of drawing when sequentially drawing for each slice, the drawing position of the virtual object changes for each slice. Then, the drawing result in units of slices includes the generated image (RGB image) and the distance information and the speed information of the virtual object 50.

The virtual object motion prediction and deformation unit 1031 predicts the position of the virtual object after a predetermined time (predicted display time) on the basis of the input speed information and distance information of the virtual object, and deforms the generated image in units of slices so that the virtual object is displayed at the predicted position.

The position/orientation prediction and deformation unit 1032 acquires a prediction result of the latest position/orientation information from the position/orientation prediction unit 104, and further performs image deformation on the generated image in units of slices so that the virtual object is displayed at a position viewed from a viewpoint position after a predetermined time (expected display time) on the basis of the prediction result.

As described above, by predicting the position of the virtual object and the position and orientation of the user and performing image deformation on the mobile terminal 10 side, too, it is possible to reduce the display delay of the virtual object to the maximum.

Figure 14:
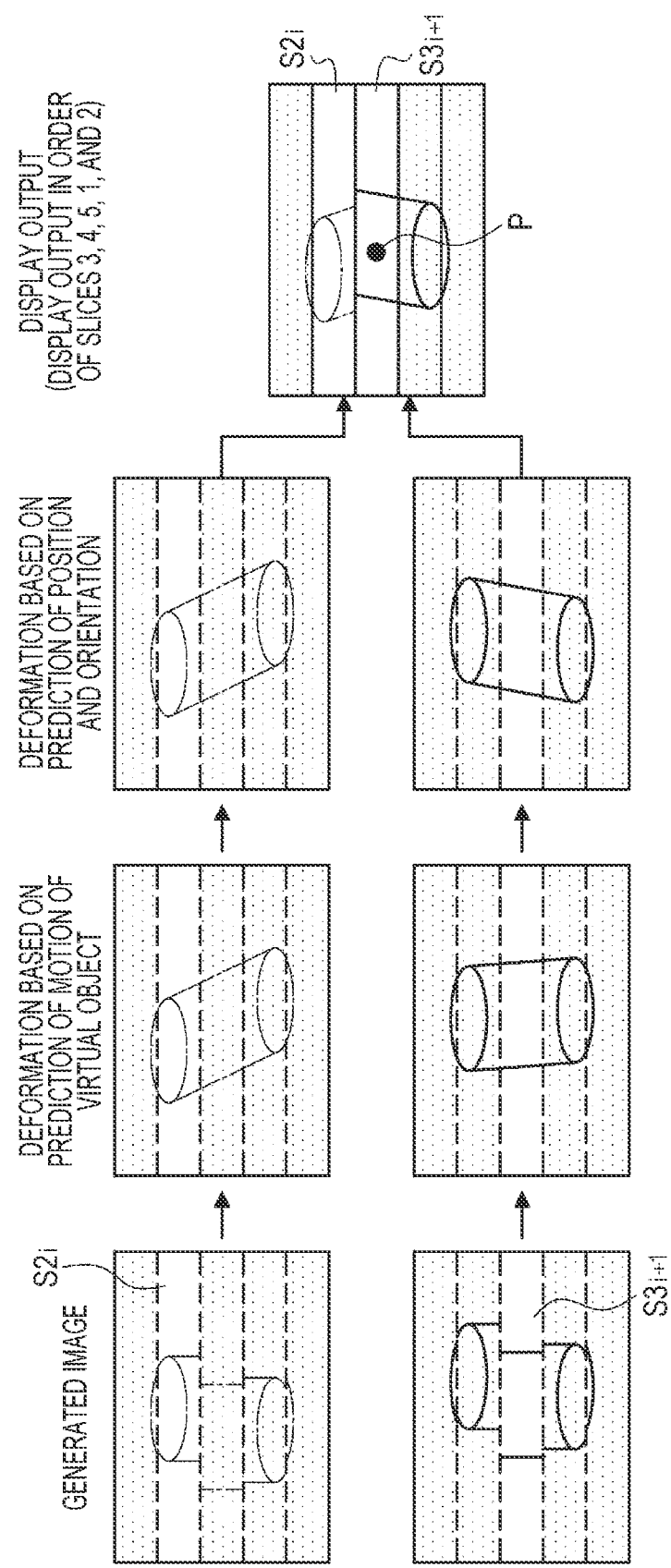
FIG. 14 is a diagram illustrating one example of a tearing phenomenon that may occur at the time of display.

However, in a case where a slice with a high importance such as that including a gaze point is preferentially drawn, transmitted, received, and displayed, as illustrated in FIG. 14, there is a possibility that a tearing phenomenon occurs between slice $2_i$ displayed at the end of the i-th frame and slice $3_{i+1}$ displayed at the beginning of the i+1-th frame. Such tearing may also occur due to a prediction error. In particular, since slice $3_{i+1}$ is a frame switching part, tearing easily occurs between slice $3_{i+1}$ and the immediately preceding slice. Furthermore, since slice $3_{i+1}$ is a display area with a high importance including the gaze point P, the tearing tends to be conspicuous. Furthermore, even in a display of a type in which the scanning lines can be controlled in an arbitrary order, in a case where the lighting time is lengthened to increase the luminance and the black insertion period is not formed, tearing may occur similarly.

Figure 15:
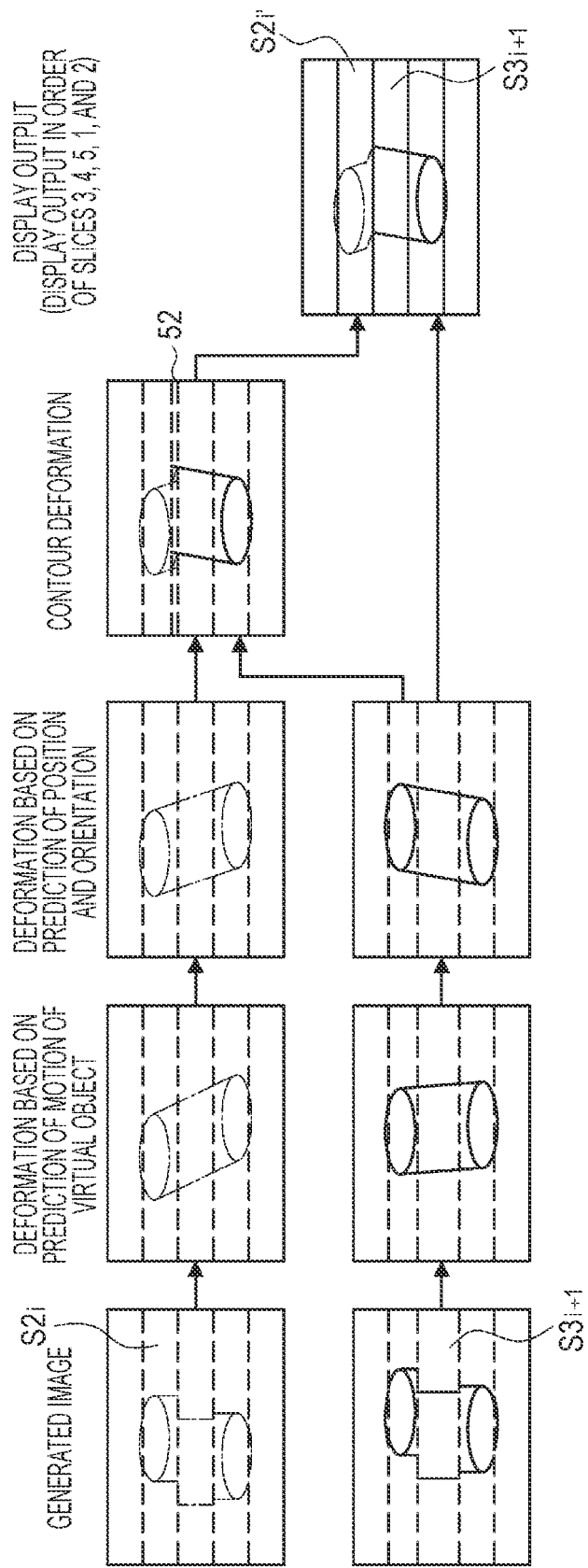
FIG. 15 is a diagram for describing image deformation of a contour line of a virtual object according to the present embodiment.

Therefore, in the present embodiment, the inter-slice contour deformation unit 1033 performs processing of deforming the contour of the virtual object crossing the slices so as to be continuous. FIG. 15 is a diagram for describing image deformation of a contour line of a virtual object according to the present embodiment.

First, at the time of drawing slice $3_{i+1}$ (of i+1-th frame) including the gaze point, the image generation unit 201 of the server 20 performs drawing by slightly increasing the width of the slice in the upward direction, and creates an area (hereinafter referred to as overlapping area 52) overlapping with slice $2_i$ (of i-th frame) displayed immediately before. Next, the image deformation unit 103 of the mobile terminal 10 deforms the contour line of the virtual object between slices by the inter-slice contour deformation unit 1033 through deformation based on the prediction of motion of the virtual object by the virtual object motion prediction and deformation unit 1031 and deformation based on the prediction of the position and orientation by the position/orientation prediction and deformation unit 1032. Specifically, the image deformation is performed such that the deviation of the contour line of the virtual object in the overlapping area 52 illustrated in FIG. 15 is minimized (acquisition of slice $2_{i'}$ subjected to image deformation). That is, the inter-slice contour deformation unit 1033 brings the contour line of the virtual object in the overlapping area 52 overlapping slice $3_{i+1}$ in slice $2_i$ close to the contour line of the virtual object in slice $3_{i+1}$, so that the contour line can appear to be continuous between slice $2_i$ and slice $3_{i+1}$. The contour line can be deformed using, for example, a set of vertices (polygon mesh).

FIG. 16 is a diagram specifically describing deformation of a contour line of a virtual object according to the present embodiment. As illustrated in FIG. 16, first, the inter-slice contour deformation unit 1033 extracts a contour for the overlapping area 52 of adjacent slices. The overlapping area 52 of adjacent slices is, for example, an overlapping area $52_i$ in slice $2_i$ of the i-th frame and an overlapping area $52_{i+1}$ in slice $3_{i+1}$ of the i+1-th frame.

Next, the inter slice contour deformation unit 1033 finds corresponding points (corresponding vertices) between the extracted contours, and sets the corresponding points to polygon meshes. Next, the two polygon meshes (polygon mesh of overlapping area $52_i$ and polygon mesh of overlapping area $52_{i+1}$) are synthesized. Then, the inter-slice contour deformation unit 1033 applies the combined mesh to the overlapping area $52_i$ to obtain an image in which the deviation of the contour is minimized.

Note that in the synthesis of the two polygon meshes, in order to make the contour line appear to be continuous across the slices, it is necessary to select the control points of the meshes so as to be closer to an area (overlapping area $52_i$) of the slice located on the upper side in the upper part of the overlapping area and to be closer to an area (overlapping area $52_{i+1}$) of the slice located on the lower side in the lower part of the overlapping area. More specifically, for example, the following implementation examples can be cited.

Expression 1

When a set of corresponding points in the upper slice is $V^u = \{v_1^u, v_2^u, \ldots, v_n^u\}$ where each corresponding point is $v_k^u = (x_k^u, y_k^u)$ and a set of corresponding points in the lower slice is $V^d=\{v_1^d, v_2^d, \ldots, v_n^d\}$ where each corresponding point is $V_k^d=(x_k^d, y_k^d)$, in each vertex $v_k^m=(x_k^m, y_k^m)$ of a set of vertices in the synthesized mesh $v^m=\{v_1^m, v_2^m, \ldots, v_n^m\}$, the y coordinate is a simple average $y_k^m=(y_k^u+y_k^d)/2$, and the x coordinate is an average $x_k^m=x_k^u \cdot \alpha+x_k^d \cdot (1-\alpha)$ weighted by the internal division ratio of the y coordinate $\alpha=(y_k^m-y_k^u)/(y_k^d-y_k^u)$ Note that the method of deforming the contour line of the virtual object crossing the slices described above is an example, and the present embodiment is not limited thereto.

3-3-3. Adjustment of Division Line

As a third countermeasure, the image generation unit 201 of the server 20 adjusts division lines that divide one frame into a plurality of areas. If there is a boundary (division line) of slices in the vicinity of the user's gaze point, tearing is easily noticeable. Hence, the image generation unit 201 adjusts division lines such that the gaze point is near the center of a slice (center in width direction). Hereinafter, a description will be given with reference to FIG. 17.

FIG. 17 is a diagram for describing adjustment of division lines for dividing one frame into a plurality of slices according to the present embodiment. As illustrated on the left in FIG. 17, the image generation unit 201 normally equally divides a height $h_s$ of one frame by a predetermined number of slices (display time becomes equal). However, as illustrated in the center in FIG. 17, the image Generation unit 201 adjusts the division lines (i.e., adjusts widths of slices) such that the gaze point is near the center in the width direction (height direction) of slice S3. Furthermore, in consideration of the possibility that the gaze point may move slightly up and down, the image generation unit 201 may further curb tearing by randomly moving the division line up and down for each frame as illustrated on the right in FIG. 17 even in a case where the gaze point does not move. That is, the image generation unit 201 changes the width (height) of the slice (first display area) including the gaze point for each frame, and makes the width (height) different at least between consecutive frames.

More specifically, for example, a y coordinate $y_s[j]$ of the upper side of a slice j (j-th slice) including the gaze point is obtained by the following formula. Note that j is an integer of $1 \leq j \leq N$.

$$y_s[j] = (j-1) \cdot \frac{h_s}{N} \quad \text{[Expression 2]}$$

Next, as illustrated in the center in FIG. 17, the y coordinate $y_s[j]$ of the upper side of the slice j in a case where the y coordinate of the gaze point is $y_{gaze}$ is obtained by the following formula. Note that when j is an integer of $2 \leq j \leq N$ and j=1, $y_s[1]=0$.

$$y_s[j] = (j-2) \cdot \frac{h_s}{N} + \left(y_{gaze} \bmod \frac{h_s}{N}\right) \quad \text{[Expression 3]}$$

In addition, when the division lines are randomly shifted as illustrated on the right in FIG. 17, $y_s[j]$ is obtained by introducing a dither term as shown in the following formula. Note that j is an integer of $2 \leq j \leq N$. Here, the dither term [i, j] is the j-th slice of the i-th frame. Also, when j=1, $y_s[1]=0$.

$$y_s[j] = (j-2) \cdot \frac{h_s}{N} + \left(y_{gaze} \bmod \frac{h_s}{N}\right) + \text{dither}[i, j] \quad \text{[Expression 4]}$$

4. SUPPLEMENT

As described above, in the embodiment of the present disclosure, it is possible to reduce a delay in a case where data of a virtual object generated by an external device is received and displayed.

Hereinabove, a preferred embodiment of the present disclosure has been described in detail with reference to the accompanying drawings. However, the present technology is not limited to such an example. It will be apparent to those skilled in the art of the present disclosure that various changes or modifications can be conceived within the scope of the technical idea described in the claims. It is understood that these also belong to the technical scope of the present disclosure, as a matter of course.

For example, in the above embodiment, it has been described that the head position/orientation estimation and the eyeball position/orientation estimation are performed in the position/orientation estimation unit 101. However, the present disclosure is not limited thereto. For example, it is possible to estimate only the position and orientation of the head and transmit the head position/orientation information to the server 20. Furthermore, in the above embodiment, it has been described that the position and orientation of the head and the position and orientation of the eyeballs are predicted in the position/orientation prediction unit 104 however, the present disclosure is not limited thereto. For example, it is possible to predict only the position and orientation of the head and output the prediction result to the image deformation unit 103. The image deformation unit 103 may perform image deformation using only the head position/orientation information or only the prediction result of the position and orientation of the head. Furthermore, the position and orientation of the head and the position and orientation of the eyeballs are examples of motion information of the user, and the present disclosure is not limited thereto.

Furthermore, it is also possible to create a computer program for causing hardware such as the CPU, the ROM, and the RAM built in the mobile terminal 10 or the server 20 described above to exhibit the functions of the mobile terminal 10 or the server 20. Furthermore, a computer-readable storage medium storing the computer program is also provided.

Furthermore, the effects described in the present specification are merely illustrative or exemplary, and are not limiting. That is, the technology according to the present disclosure can exhibit other effects apparent to those skilled in the art from the description of the present specification, in addition to or instead of the effects described above.

Note that the present technology can also be configured in the following manner.

(1)

A display processing device including:
  a transmission unit that transmits first motion information of a mobile terminal to an external device;
  a reception unit that receives, at a first time, data of a first display area of a virtual object drawn on the basis of the first motion information by the external device, and receives, at a second time later than the first time, data of a second display area adjacent to the first display area of the virtual object drawn on the basis of the first motion information by the external device; and a display control unit that, after displaying the received data of the first display area, performs control to display the data of the second display area together with the data of the first display area as one frame on a display device of the mobile terminal.

(2)

The display processing device according to (1) above, in which the reception unit receives, at a third time later than the second time, data of a third display area of the virtual object corresponding to a part of the one frame drawn on the basis of the first motion information by the external device, and the display control unit controls the display device that displays the data of the first display area at a time earlier than the third time and displays the data of the third display area later than the display of the data of the second display area.

(3)

The display processing device according to (1) or (2) above further including a deformation unit that deforms the received data of the second display area on the basis of second motion information acquired later than the first motion information, in which the display control unit performs control to display the deformed data of the second display area.

(4)

The display processing device according to (3) above, in which among display areas obtained by dividing an area of one frame displayed on the display device, the first display area is a display area located in an area including a user's gaze point on the display device.

(5)

The display processing device according to (4) above, in which the second display area is a display area located in an area closer to the gaze point than a third display area received by the reception unit at a third time later than the second display area.

(6)

The display processing device according to (4) or (5) above, in which the deformation unit deforms a contour line of a virtual object so as to be continuous, the contour line crossing boundaries of a plurality of adjacent display areas among a plurality of display areas forming one frame displayed on the display device.

(7)

The display processing device according to any one of (4) to (6) above, in which the display control unit performs control to display data of a third display area adjacent to the first display area on a side opposite to the second display area and received at a third time later than the second time after lapse of a certain time from completion of display of the data of the first display area.

(8)

The display processing device according to any one of (4) to (7) above, in which the first display area is generated such that the gaze point is located at a center in a width direction of the first display area.

(9)

The display processing device according to (8) above, in which a width of the first display area is different between consecutive frames.

(10)

The display processing device according to any one of (1) to (9) above, in which the first motion information includes information on a position and an orientation detected by a motion sensor provided in the mobile terminal.

(11)

The display processing device according to (3) above, in which the second motion information includes information on a position and an orientation detected by a motion sensor provided in the mobile terminal, and the deformation unit deforms the data of the second display area on the basis of a result predicted on the basis of the second motion information.

(12)

A display processing method including the steps of a processor transmitting first motion information of a mobile terminal to an external device, receiving, at a first time, data of a first display area of a virtual object drawn on the basis of the first motion information by the external device, and receiving, at a second time later than the first time, data of a second display area adjacent to the first display area of the virtual object drawn on the basis of the first motion information by the external device, and after displaying the received data of the first display area, performing control to display the data of the second display area together with the data of the first display area as one frame on a display device of the mobile terminal.

(13)

A storage medium storing a program for causing a computer to function as:

a transmission unit that transmits first motion information of a mobile terminal to an external device;

a reception unit that receives, at a first time, data of a first display area of a virtual object drawn on the basis of the first motion information by the external device, and receives, at a second time later than the first time, data of a second display area adjacent to the first display area of the virtual object drawn on the basis of the first motion information by the external device; and a display control unit that, after displaying the received data of the first display area, performs control to display the data of the second display area together with the data of the first display area as one frame on a display device of the mobile terminal.

(14)

An information processing device including a reception unit that receives first motion information of a mobile terminal, and a transmission unit that transmits, at a first time, data of a first display area of a virtual object drawn as a part of one frame on the basis of the first motion information to a display processing device that performs control to display the data of the first display area on a display device of the mobile terminal, and, after drawing the data of the first display area on the basis of the first motion information, transmits, at a second time later than the first time, data of a second display area adjacent to the first display area of the virtual object drawn as another part of the one frame to the display processing device.

REFERENCE SIGNS LIST

10 Mobile terminal
100 Control unit
101 Position/orientation estimation unit
102 Data decoding unit
103 Image deformation unit
104 Position/orientation prediction unit
105 Display control unit
110 Sensor unit
120 Communication unit
130 Clock signal generation unit
140 Time stamp counter
150 Storage unit
160 Display unit
20 Server
200 Control unit
201 Image generation unit
202 Position/orientation prediction unit
203 Data encoding unit
220 Communication unit
230 Clock signal generation unit
240 Time stamp counter
250 Storage unit

The invention claimed is:

1. A display processing device comprising:
a transmission unit configured to transmit first motion information of a mobile terminal to an external device, the mobile terminal including a display device;
a reception unit configured to receive, at a first time, data of a first display area of a virtual object drawn on a basis of the first motion information by the external device, and receive, at a second time later than the first time, data of a second display area adjacent to the first display area of the virtual object drawn on a basis of the first motion information by the external device; and
a display control unit configured to, after displaying the received data of the first display area, perform control to display the data of the second display area together with the data of the first display area as one frame on the display device of the mobile terminal.

2. The display processing device according to claim 1, wherein
the reception unit receives, at a third time later than the second time, data of a third display area of the virtual object corresponding to a part of the one frame drawn on a basis of the first motion information by the external device, and
the display control unit controls the display device that displays the data of the first display area at a time earlier than the third time and displays the data of the third display area later than the display of the data of the second display area.

3. The display processing device according to claim 1 further comprising a deformation unit configured to deform the received data of the second display area on a basis of second motion information acquired later than the first motion information, wherein
the display control unit performs control to display the deformed data of the second display area.

4. The display processing device according to claim 3, wherein among display areas obtained by dividing an area of one frame displayed on the display device, the first display area is a display area of the display device that is located in an area including a user's gaze point on the display device.

5. The display processing device according to claim 4, wherein
the second display area is a display area located in an area closer to the gaze point than a third display area received by the reception unit at a third time later than the second display area.

6. The display processing device according to claim 4, wherein
the deformation unit deforms a contour line of a virtual object so as to be continuous, the contour line crossing boundaries of a plurality of adjacent display areas among a plurality of display areas forming one frame displayed on the display device.

7. The display processing device according to claim 4, wherein
the display control unit performs control to display data of a third display area adjacent to the first display area on a side opposite to the second display area and received at a third time later than the second time after lapse of a certain time from completion of display of the data of the first display area.

8. The display processing device according to claim 4, wherein
the first display area is generated such that the gaze point is located at a center in a width direction of the first display area.

9. The display processing device according to claim 8, wherein
a width of the first display area is different between consecutive frames.

10. The display processing device according to claim 1, wherein
the first motion information includes information on a position and an orientation detected by a motion sensor provided in the mobile terminal.

11. The display processing device according to claim 3, wherein
the second motion information includes information on a position and an orientation detected by a motion sensor provided in the mobile terminal, and
the deformation unit deforms the data of the second display area on a basis of a result predicted on the basis of the second motion information.

12. A display processing method comprising:
transmitting first motion information of a mobile terminal to an external device, the mobile device including a display device;
receiving, at a first time, data of a first display area of a virtual object drawn on a basis of the first motion information by the external device, and receiving, at a second time later than the first time, data of a second display area adjacent to the first display area of the virtual object drawn on a basis of the first motion information by the external device; and
after displaying the received data of the first display area, performing control to display the data of the second display area together with the data of the first display area as one frame on the display device of the mobile terminal.

13. A computer-readable storage medium having embodied thereon a program, which when executed by a computer causes the computer to execute a method, the method comprising:
- transmitting first motion information of a mobile terminal to an external device, the mobile terminal including a display device;
- receiving, at a first time, data of a first display area of a virtual object drawn on a basis of the first motion information by the external device, and receiving, at a second time later than the first time, data of a second display area adjacent to the first display area of the virtual object drawn on a basis of the first motion information by the external device; and
- performing, after displaying the received data of the first display area, performs control to display the data of the second display area together with the data of the first display area as one frame on the display device of the mobile terminal.

14. An information processing device comprising:
- a reception unit configured to receive first motion information of a mobile terminal, the mobile terminal including a display device; and
- a transmission unit configured to transmit, at a first time, data of a first display area of a virtual object drawn as a part of one frame on a basis of the first motion information to a display processing device that performs control to display the data of the first display area on the display device of the mobile terminal, and, after drawing the data of the first display area on a basis of the first motion information, transmit, at a second time later than the first time, data of a second display area adjacent to the first display area of the virtual object drawn as another part of the one frame to the display processing device.

* * * * *